(12) United States Patent
Fredriksson

(10) Patent No.: US 7,100,196 B2
(45) Date of Patent: Aug. 29, 2006

(54) DEVICE IN A SYSTEM OPERATING WITH CAN-PROTOCOL AND IN A CONTROL AND/OR SUPERVISION SYSTEM

(75) Inventor: Lars-Berno Fredriksson, Kinna (SE)

(73) Assignee: Kvaser Consultant AB, Mölndal (SE)

( * ) Notice: Subject to any disclaimer, the term of this patent is extended or adjusted under 35 U.S.C. 154(b) by 1099 days.

(21) Appl. No.: 09/847,325

(22) Filed: May 3, 2001

(65) Prior Publication Data

US 2002/0041688 A1 Apr. 11, 2002

Related U.S. Application Data

(62) Division of application No. 09/101,748, filed on Aug. 31, 1998, now Pat. No. 6,467,039.

(30) Foreign Application Priority Data

Feb. 22, 1996 (SE) .................................. 9600652
Feb. 22, 1996 (SE) .................................. 9600653

(51) Int. Cl.
*G06F 15/16* (2006.01)
(52) U.S. Cl. ............................................ 726/3; 709/22
(58) Field of Classification Search .................... 726/3; 709/208

See application file for complete search history.

(56) References Cited

U.S. PATENT DOCUMENTS

| | | | | |
|---|---|---|---|---|
| 4,876,742 A | | 10/1989 | Vacon et al. .................. 455/66 |
| 5,101,501 A | * | 3/1992 | Gilhousen et al. ........... 455/442 |
| 5,235,631 A | | 8/1993 | Grube et al. .................. 379/58 |
| 5,323,385 A | * | 6/1994 | Jurewicz et al. ............. 370/300 |
| 5,383,116 A | | 1/1995 | Lennartsson ................ 364/138 |
| 5,392,454 A | * | 2/1995 | Kowal et al. ............... 340/7.39 |
| 5,455,762 A | * | 10/1995 | Braun .......................... 700/24 |
| 5,596,437 A | | 1/1997 | Heins .......................... 359/144 |
| 5,636,211 A | * | 6/1997 | Newlin et al. ............... 370/465 |
| 5,687,081 A | * | 11/1997 | Wellman et al. ............... 701/50 |
| 5,696,911 A | * | 12/1997 | Fredriksson ................. 710/106 |
| 5,719,667 A | * | 2/1998 | Miers .......................... 356/73 |
| 5,732,074 A | * | 3/1998 | Spaur et al. ................. 370/313 |
| 5,772,963 A | * | 6/1998 | Cantatore et al. ............. 422/67 |

(Continued)

OTHER PUBLICATIONS

Zuberi et al., Non-Preemptive Scheduling of Messages on Controller Area Network for Real-Time Control Applications, 1995, IEEE, pp. 240-249.*

(Continued)

*Primary Examiner*—Ayaz Sheikh
*Assistant Examiner*—David Garcia Cervetti
(74) *Attorney, Agent, or Firm*—Connolly Bove Lodge & Hutz LLP; Larry J. Hume

(57) ABSTRACT

A control supervision system incorporates a digital serial communication and modules that are mutually communicable to this and operate with CAN-protocol. A control desk can be wirelessly connected to one or more modules operating with a signal protocol which does not take into account arbitration and/or confirmation functions appearing in the CAN-system. A particular receiving communication part executes the conversion of the signal protocol to the signal protocol of the CAN-system. A device for controlling a function in a first module in a CAN-system via a wireless connection to a second module in the system is provided. A system of mutually separate units, where each unit operates with a CAN-signalling protocol, intercommunicating with an identification system in which a key allocation between the units is based upon identities that are assigned by a module in the unit or a master system is also provided.

17 Claims, 14 Drawing Sheets

U.S. PATENT DOCUMENTS

| | | | | |
|---|---|---|---|---|
| 5,839,534 | A * | 11/1998 | Chakraborty et al. | 180/169 |
| 5,903,565 | A * | 5/1999 | Neuhaus et al. | 370/402 |
| 5,953,681 | A * | 9/1999 | Cantatore et al. | 702/31 |
| 6,064,299 | A | 5/2000 | Lesesky et al. | |
| 6,105,089 | A * | 8/2000 | Chari et al. | 710/302 |
| 6,161,190 | A * | 12/2000 | Fischer et al. | 713/600 |
| 6,192,281 | B1 * | 2/2001 | Brown et al. | 700/2 |
| 6,467,039 | B1 * | 10/2002 | Fredriksson | 713/151 |
| 6,519,720 | B1 * | 2/2003 | Mores | 714/43 |
| 6,816,466 | B1 * | 11/2004 | Daniel | 370/254 |
| 6,850,973 | B1 * | 2/2005 | Larson et al. | 709/221 |
| 7,010,362 | B1 * | 3/2006 | Dove et al. | 700/18 |
| 2002/0041688 | A1 * | 4/2002 | Fredriksson | 380/270 |
| 2002/0044660 | A1 * | 4/2002 | Fredriksson | 380/370 |
| 2002/0112016 | A1 * | 8/2002 | Peshkin et al. | 709/208 |
| 2003/0002681 | A1 * | 1/2003 | Fredriksson | 380/278 |
| 2004/0023678 | A1 * | 2/2004 | Fredriksson | 455/502 |
| 2004/0236885 | A1 * | 11/2004 | Fredriksson et al. | 710/100 |
| 2005/0030969 | A1 * | 2/2005 | Fredriksson | 370/454 |
| 2005/0251701 | A1 * | 11/2005 | Fredriksson | 713/500 |
| 2006/0041630 | A1 * | 2/2006 | Naismith | 709/208 |

OTHER PUBLICATIONS

Zuberi et al., Real-time decentralized control with CAN, 1996, IEEE, vol. 1, pp. 93-99.*

Lars-Berno Fredriksson, Controller Area Networks and the protocol CAN for machine control systems, 1994, Mechatronics vol. 4 No. 2, pp. 159-192.*

Hansson et al., Analysing Real-Time Communications: Controller Area Network (CAN), 1994, IEEE, pp. 259-263.*

Gollmer et al., Flexible Automation of a Biotechnological Pilot-Plant with a Real-Time-Network, 1994, IEEE Conference on Control Applications, Glasgow, pp. 1941-1946.*

Cena et al., A distributed mechanism to improve fairness in CAN networks, 1995, IEEE, pp. 3-11.*

* cited by examiner

DEVICE IN A SYSTEM OPERATING WITH CAN-PROTOCOL AND IN A CONTROL AND/OR SUPERVISION SYSTEM

CROSS REFERENCES TO RELATED APPLICATIONS

The present application is a divisional of U.S. patent application Ser. No. 09/101,748, filed Aug. 31, 1998 now U.S. Pat. No. 6,467,039.

BACKGROUND

The present invention relates to a device in a machine-control system and/or process-supervision system operating with the Controller Area Network" ("CAN")-protocol according to standard ISO 11898. CAN-systems of this type comprise modules which are intercommunicable via a digital serial communication and in which a control and/or supervisory function can be realized from a first module or from a unit, which is communicable with the CAN-system, belonging to one or more second module(s).

The present invention relates to a device in a machine-control system or process-control system. The said system has in the present case been referred to as a CAN-system, since the systems in question are required to use the signal protocol according to CAN (Controller Area Network, corresponding to standard ISO 11898). The invention in this case relates to those types of CAN-system comprising modules which are connectable via a digital serial communication and in which a function in a first module is intended to be able to be observed, stimulated or registered at a location for the placement of the first module. Reference is also made to Swedish patent application "Device in a system operating with CAN-protocol", which was submitted on the same day by the same applicant and inventor.

It is previously known to be able to control machinery and equipment at control desks which are connected via fixed connections or wireless connections. These proposals make use of the general control and supervision principles. With reference to control desk arrangements proposed with CAN-protocol, the arrangements in question are primarily those with wire connections. Reference is also made to U.S. Pat. No. 5,392,454.

With machine-control and process-control systems of this category, it is previously known that it is necessary to supervise the aggregates served by the modules such that in fault-searching, system design, etc., it is possible to establish whether the equipment controlled by a particular module is behaving as expected. It can be stated in this context that it may be necessary to monitor the functions at valves, thermometers, etc., so that in certain functional states it can be seen or registered whether the components in question are actually performing their expected function. It is also known to utilize machine-control systems and process-control systems in which the equipment parts are connected via relatively long digital serial communications. The connection can also be established at locations and sites where accessibility is limited.

In the radio-controlling of machines operating with CAN-protocol, problems arise from the fact that the protocol calls for arbitration and confirmation functions which are extremely time-critical. In order to ensure that the modules do not misinterpret a particular message in question, in certain cases the receipt of a one over the connection must result, for example, in a zero being immediately presented to prevent disturbances occurring within the system. This calls for sending and receiving to be effected simultaneously by one and the same module, which, in turn, calls for a full duplex connection and time synchronization between the sending and receiving channel in each module and predetermined maximum wave propagation time within the system. This is difficult to achieve in a radio system when such a system is often chosen to enable the distance between the modules within a system which are connected by radio link to be easily varied. Radiocommunication is therefore less suitable for systems using the CAN-protocol. The object of the present invention is to solve these problems.

In certain contexts, it is vital to be able to make use of repetition functions linked to machines or machinery stocks operating with CAN-protocol. At places which are difficult to survey or difficult to access, there is a need to build up an existing CAN-system and introduce a repetition function over difficult stretches or to create on a temporary or longer term basis two separately working CAN-systems instead of one. In this context, there is a need to be able to facilitate system developments and system applications. The object of the invention is to solve these problems also.

There is also a need to achieve effective coordination of machine-controls in machinery stocks, e.g. in weaving sheds in which weaving machines have hitherto been controlled individually and provided with their own man-machine interface such as control desks. There is a wish to be able to introduce CAN-protocol into the control of machines of this category, this having been hindered by the above-specified problems. The object of the present invention is to solve these problems also and it is proposed, in respect of this category of machinery-stock control, that the controls be effected via radiocommunication from and to a common man-machine interface, such as a control unit or control desk. The control equipment, is thereby simplified and a coordinated, effective control is able to be established in terms of service and production via or in the machinery stock.

Radiocommunication is often utilized between an operator's control unit and the control system of the machine which he controls. Examples of such systems are radio-controlled airplanes, radio-controlled contracting machinery, radio-controlled hoisting cranes, etc. of various types. One problem is here to set up a radio channel which is exclusively between control unit and machine, such that the connection is not disturbed by other operator/machine connections. The object of the present invention is to solve this problem also.

The invention also allows reduced susceptibility to theft and offers high security within the system per se.

There is a great need to be able to carry out fault searches and tests on modules which are situated at a distance apart and in which a functional effect upon a first module is wanted to be able to be followed at a second module, and vice versa. For instance, there is a desire in certain situations to initiate controls at a master in the CAN-system in order to obtain manifestations at one or more slave modules. There is here a need to see whether the function is being correctly performed by the components or aggregates controlled by the module in question.

There is also a need to be able to stimulate a component or aggregate at a module and to discover what repercussions this has.

There is also a need to be able to carry out registration operations in a fault-searching and testing context for a certain period, as well as to acquire direct visual and signal information at the site for the module subjected to testing or fault-searching.

The above must be practicable even if the modules are far apart and hidden from each other. Preferably, the above will be able to be effected via an already existing switching function, i.e. connections and disconnections do not need to be made in each separate case/in respect of each module.

SUMMARY

The invention aims to solve the whole or parts of the above problems.

What primarily can be considered to be characteristic of a device according to the invention is that it comprises two or more communication parts which form part of the CAN-system, respectively between the CAN-system and the unit mentioned in the introduction, and which are communicable via one or more wireless connections, that when a transmission is made from a first communication part to a second communication part, the parts operate with a signal protocol which takes no account of arbitration and/or confirmation function(s) found in the CAN-system. A particular receiving communication part executes or assists in the conversion of the said signal protocol to the signal protocol of the CAN-system.

In one embodiment, the communication parts can be coupled to the CAN-system, which in the non-connected or non-activated state of the communication parts forms a unitary system and which in the connected or activated state of the communication parts form two CAN-systems which operate separately relative to each other.

A particular pair of communication parts can in this case operate with a protocol which is distinct from the CAN-protocol and is better suited for radiocommunication, e.g. Aloha, Ethernet, the WaveRaider protocol from GEC Plessey in England, etc. In one embodiment, the invention is utilized in respect of a machinery stock. As an example of a machinery stock can be cited weaving machines which are installed in one or more weaving sheds and are respectively allocated one or more modules. In this case, the unit can comprise a service unit common to a number of weaving machines, preferably the majority or all of the total number of weaving machines. This service unit can comprise or contain a personal computer (PC).

In the case of weaving machines in a weaving shed, one or more modules assigned to a weaving machine are connected to a service function in the weaving shed. This service function can consist of beam-changing, bobbin-changing, etc. Service staff receive information in parallel with a service machine which is appropriately connected to the particular weaving machine. Function information can therefore appear both on the unit and in control apparatus belonging to the service machine, the function measure or instruction in question being able to be prepared simultaneously or in perfect coordination between the service machine and the staff involved. An effective synthesis is obtained for production and service measures which are necessary to the weaving machines in order to maintain effective production. The machines can be coupled together in a control network in which a particular machine has its own unique code and control system in order to prevent disturbances between the machines. The frequencies are preferably chosen within the broad-band range, i.e. 1 GHz or above, preferably the open Industrial, Scientific, and Medical ("ISM") band, but infrared ("IR") frequencies and ultrasound frequencies can also be used. The latter particularly in respect of acoustic communication in an underwater environment.

The device according to the invention also relates to a system of mutually separate units which are intercommunicable by means of radiocommunications, these being able to be set up such that message channels can be realized between two or more of the said units. The radio communications operate here with an identification system in which a key allocation can be realized, which in a particular connection instance enables messages to be transferred between selected units only. The particular unit is further designed with a CAN-system (Controller Area Network), in which activations, control operations, functions, stimulations, readings, etc. in modules making up the unit are intercommunicable via a digital serial connection. The latter device is principally characterized by the fact that in each connection instance the key allocation between the units is based upon an identity/identities which, during a connection process for the connection in question, are acquired from a module in the CAN-system concerned and/or from a master system or master control centre. Further features of the devices in question can be derived from the following patent claims.

What primarily can be considered to be characteristic of a device according to the invention, comprising the module mentioned in the introduction, is that a radiocommunication apparatus is arranged for connection with a part belonging to a second module in the system for the establishment of a radiocommunication channel between the location for the placement of the first module and a location for the placement of the second module. At the location for the placement of the first module, radiocommunication equipment can be activated for initiation via a radio channel and the said part of the radiocommunication equipment by activation of a signal in the second module. This signal activation causes the first module to perform its particular control and/or supervisory function which then becomes able to be observed or registered in place of the first module.

In one embodiment, the CAN-system forms part of a machine-control system and/or process-control system in which a first signal exchange according to the CAN-protocol obtains between involved modules within the system for the control operation and the performance of the process. A first activation of the radiocommunication equipment at the first location hereupon gives rise to a second activation of circuits in the second module. This second activation induces the said signal activation in the second module.

In a further embodiment, the signal activation caused by the second activation gives rise to message initiation in the second module, which prepares to dispatch a message via the module's communication circuit, over the connection to the first module. The second module is hereupon able to transmit the thus generated message, with a predetermined order of priority, in the ordinary message or signal exchange between the modules. In one embodiment, the second module can cause interruption to the ordinary message or signal exchange in the CAN-system. That signal activation in the second module which is herein initiated by the second activation takes over the CAN-system for the generation and sending of one or more test messages via the communication circuit and the connection to the first module.

When its signal is activated on the basis of the second activation in the second module, the second module can imitate a control or supervisory function which can normally be found in the machine and/or process-control system. Alternatively, or as a supplement thereto, a control and/or supervisory function which is especially cut out for the testing function is generated.

The radiocommunication equipment preferably operates two-way (half or full duplex). This makes it possible for a stimulation of control or supervisory component(s) or equipment at the first module to produce a feedback to the second module, via the connection to the second module. The latter generates a stimulation-responding information signal, which is fed back to the radio equipment part situated at the first module. Information which is transferred via the radiocommunication equipment can thereby be indicated or presented on or at the said radiocommunication equipment part at the first module.

In one embodiment, the radiocommunication equipment part at the first module is connected to the control and or supervisory equipment served by the first module and/or directly to the module.

In one embodiment, the second module is arranged such that it is merely a so-called "gateway" between the radiocommunication of the first unit and the CAN-system, i.e. a message from the first module via radio to the second module is converted there to a CAN-message and transmitted on the bus, and vice versa.

Further characteristics derive from the following patent claims and the description. The device also therefore works in cases where the equipment in the first module is stimulated, for example, manually, which stimulation can be monitored at the control or information-supplying unit to ascertain whether there are faults in the equipment and/or the communications.

Radiocommunication between control units and machines in machinery stocks can be economically established even where the machines operate with CAN-protocol. Repetition functions can be inserted into the CAN-system or the machine and/or process-control system, which means that connections can be established for even poorly accessible locations. Proven methods are in fact able to be used in connection with the radiocommunication control operation, as regards control desks, frequency usage, security arrangements, coding, keys, etc.

The above makes it possible for testing and function-checking to be easily carried out on CAN-modules, using simulated control operations and stimulations which are introduced to second modules at a distance from the first modules. The checks can be executed even if the connecting line is long, e.g. 800 m, or the modules are hidden from one another. The stimulations can also be carried out on the visually supervised module or its equipment/components and the reactions to such stimulations can be obtained in a second direction within the CAN-system and recorded at the location for the first module(s).

DESCRIPTION OF THE FIGURES

A currently proposed embodiment of a device exhibiting the characteristics which are indicative of the invention shall be described below with simultaneous reference to the appended drawings, in which:

FIG. 10a checks whether the unit 1001 is of the right type and whether the individual is authorized to control the machine 1003. FIG. 10b illustrates the CAN-connection 1002 being disconnected and communication being made via radio, showing that the radio units 1001 and 1003R have been exchanged for the compatible units 1011 and 1010 after communication has been established.

DETAILED DESCRIPTION

Figure 1:
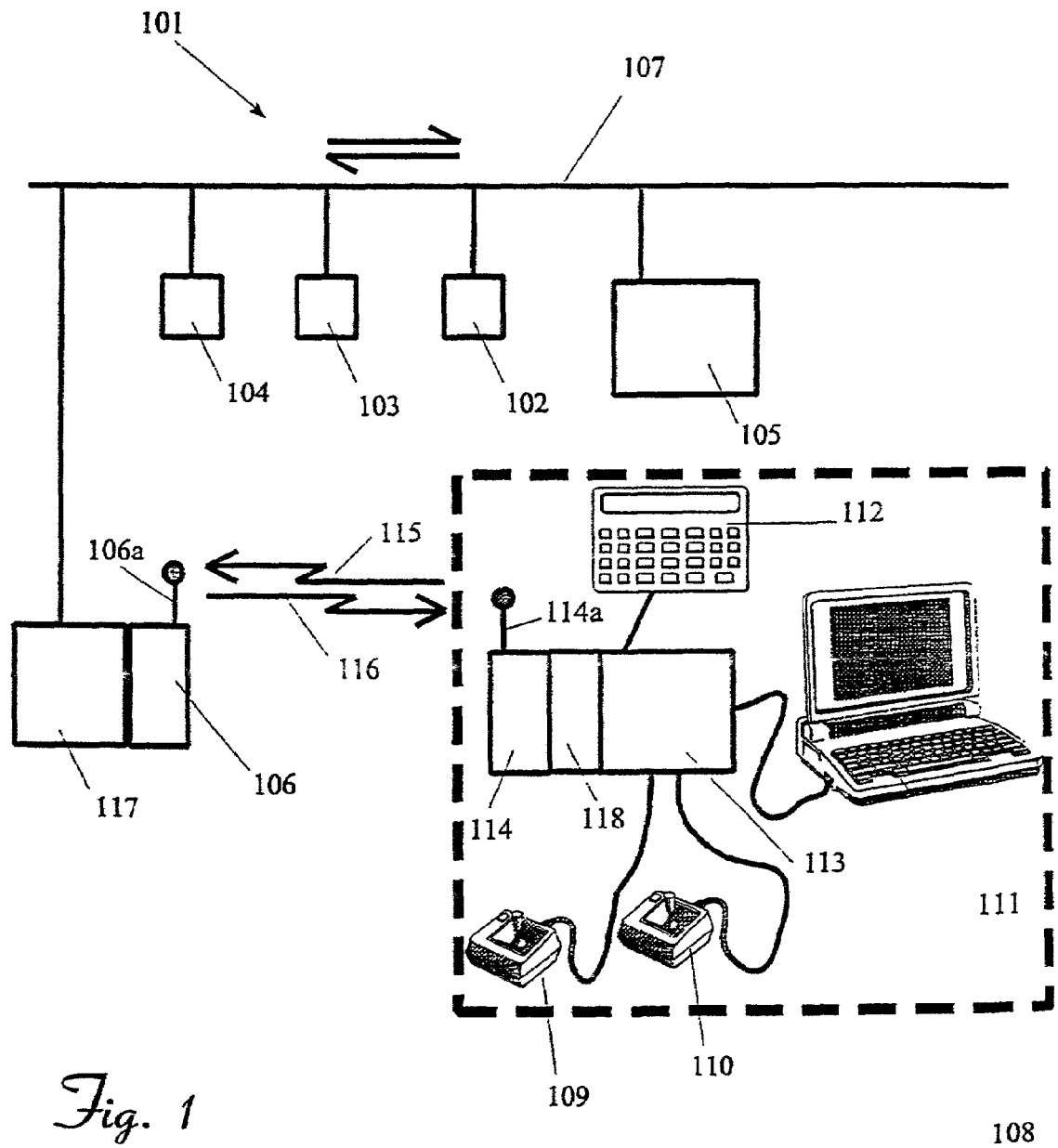
FIG. 1 shows radiocommunication between a unit and a CAN-system

FIG. 1 shows in basic representation a CAN-system 101. By this is meant a machine-control and/or machine-supervision system. Alternatively, a process-control or process-supervision system can be obtained. The CAN-system is represented by a number of modules 102, 103, 104, which serve their parts of the system in question. Also included are a control unit 105 and a radio module unit 106 connectable and connected to or forming part of the module 117. The said modules can intercommunicate via a digital serial communication connection 107. FIG. 1 also shows a control desk function 108 comprising operating levers 109 and 110 and a personal computer 111 with possible display unit 112. The unit 108 further comprises a module 113, which can be synthesized with the modules on the bus via a radiocommunication system comprising a part 114, and possibly also an adjustment unit 118, in the unit 108 and the said radio module 106. The radio module 106 and the part 114 can comprise transmitter and receiver, so that a two-way communication 115, 116 is obtained. Communication takes place via established radio channels in the radiocommunication equipment and the latter operates preferably in the broad-band range, see above. The units 116 and 114 are provided with antennae 106a and 114a for the said communication facility. The modules 102, 103, 104 can in this case represent modules forming part of machines in a machinery stock in which a particular machine can operate with a number of modules. There is therefore a possibility of accomplishing controls from the unit 108 of the modules in question via the CAN-system. The said machines in the said machinery stock can consist of weaving machines—described in greater detail below—installed in a weaving shed or of hoisting cranes within a construction area.

Figure 2:
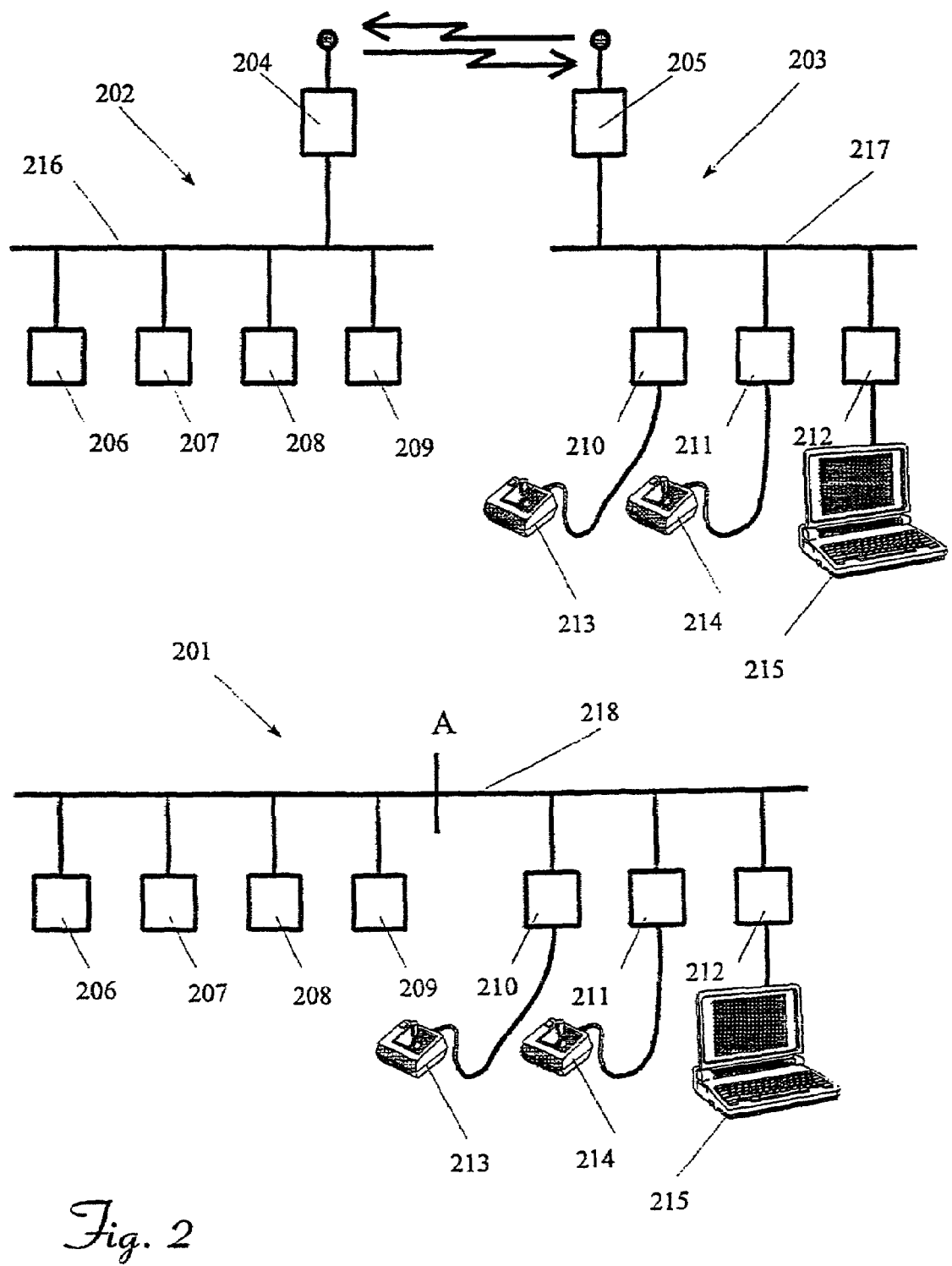
FIG. 2 shows how a CAN-system with repetition function can be divided into two CAN-systems.

FIG. 2 shows how a CAN-system 201 having a repetition function can be arranged to form two different CAN-systems 202 and 203, the respective CAN-system here being equipped with radio modules, which can comprise transmitter and receiver in accordance with the equipment 106, 117 according to FIG. 1. The radio modules have been given the designation 204 and 205 respectively. The first CAN-system has the modules 206, 207, 208, 209 and the second CAN-system has the modules 210, 211, 212. Control functions can be performed via the modules 210, 211 and 212, via the pilot pins 213, 214 and a personal computer 215. If the radio modules 204 and 205 are uncoupled, then the CAN-buses 216 and 217 of the sub-systems can be joined together to form a common CAN-bus 218 in which the junction point has been denoted by A. In the case of separate coupling and jump coupling, the CAN-bus ends would naturally have to be correctly terminated and a power supply suitably arranged. Except for certain accruing delays to the message, the divided system will function as if it were coupled together without any changes in the system's software.

Figure 3:
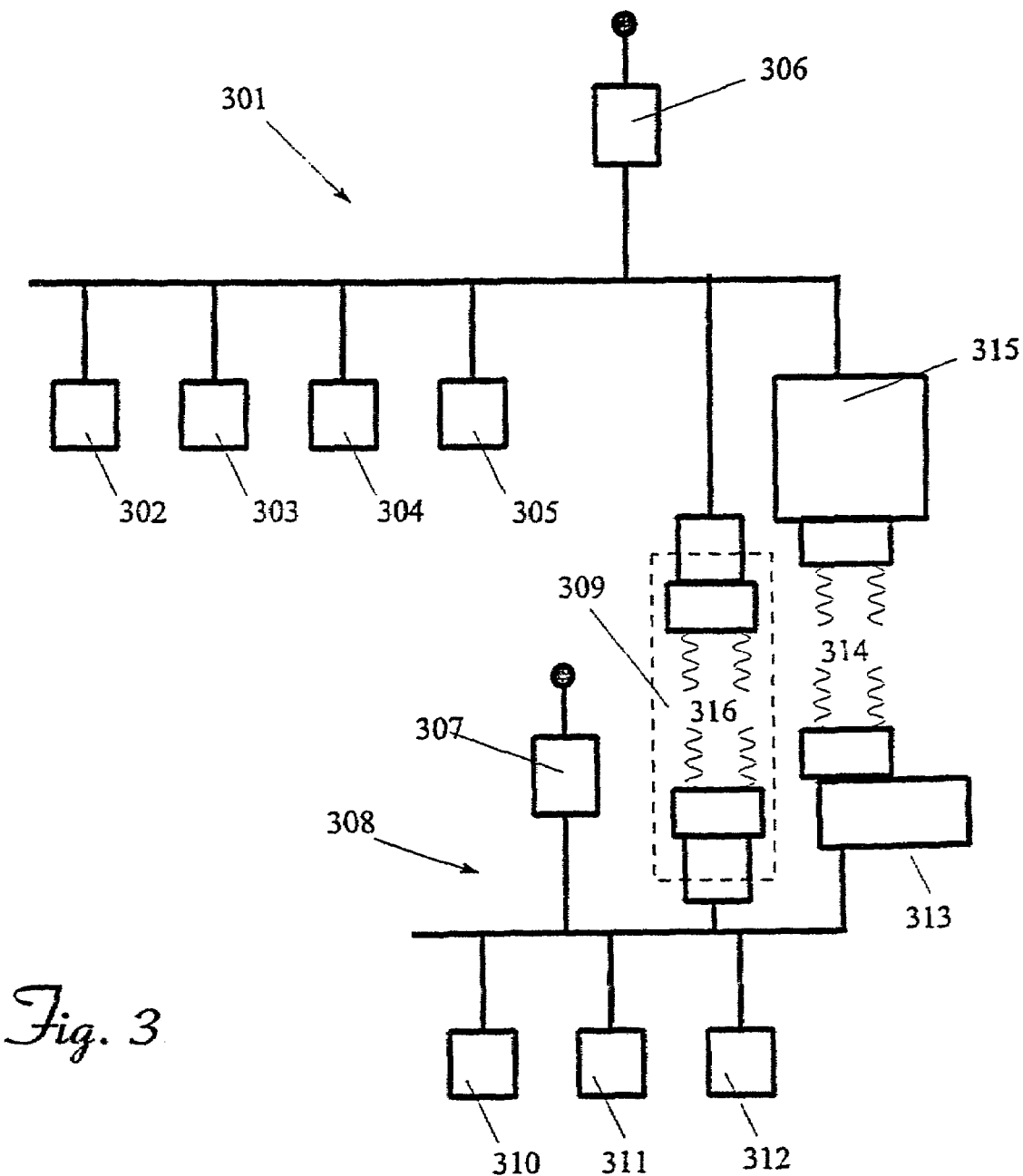
FIG. 3 shows how a CAN-system can be arranged with a control unit which can work either directly connected to the CAN-bus and then utilize power from this system or via a radio channel and then be powered from a chargeable battery.

FIG. 3 shows a further variant of a CAN-system 301 with modules 302, 303, 304 and 305. Here too, radio modules 306 and 307 are utilized. The radio module 306 is tied to the CAN-system 301, whilst the radio module 307 is assignable to a further CAN-system 308, which can be connected in two alternative ways to the CAN-system 301. The one way is realized via a mechanical, galvanically separated or wireless connection 309 or via the radio modules 306 and 307, which operate in a manner corresponding to the radio modules according to FIGS. 1 and 2. The CAN-system 308 is provided with three modules 310, 311 and 312 for the inputting and receipt of information which is relevant to the system in connection with control and/or supervision within the system. In this case, a battery system 313 is utilized to power the CAN-system 308. When the system 308 is used at a distance from the system 301 and the radio connection is utilized, then power is supplied from the battery system 313. When the systems are coupled together, then the battery system 313 is connected directly up to the power unit 315 of the CAN-system 301 via the inductive connection 314 and the battery system is then able to charge its integral accumulators. The CAN-system 301 is coupled together with 308 by the connection 309 via an inductive coupling 316. A system can thereby be coupled together or separately coupled to form two sub-systems without mechanical connectors having pins and sockets, which often cause problems when exposed to wear and tear, corrosion and physical damage. In many cases, one and the same control unit can operate either conventionally "fixed" mounted and connected to the CAN-network or as a remote control unit. In the fixed position the batteries are loaded. Whenever the unit is then wanted to be used as a remote control unit, it is simply disconnected from the, system. In the fixed-coupled position, the radio units have agreed on all parameters which are required for wireless communication. An advantage is also that the operating unit is able to be removed from the controlled unit and without a control unit the machine is difficult to steal.

Figure 4:
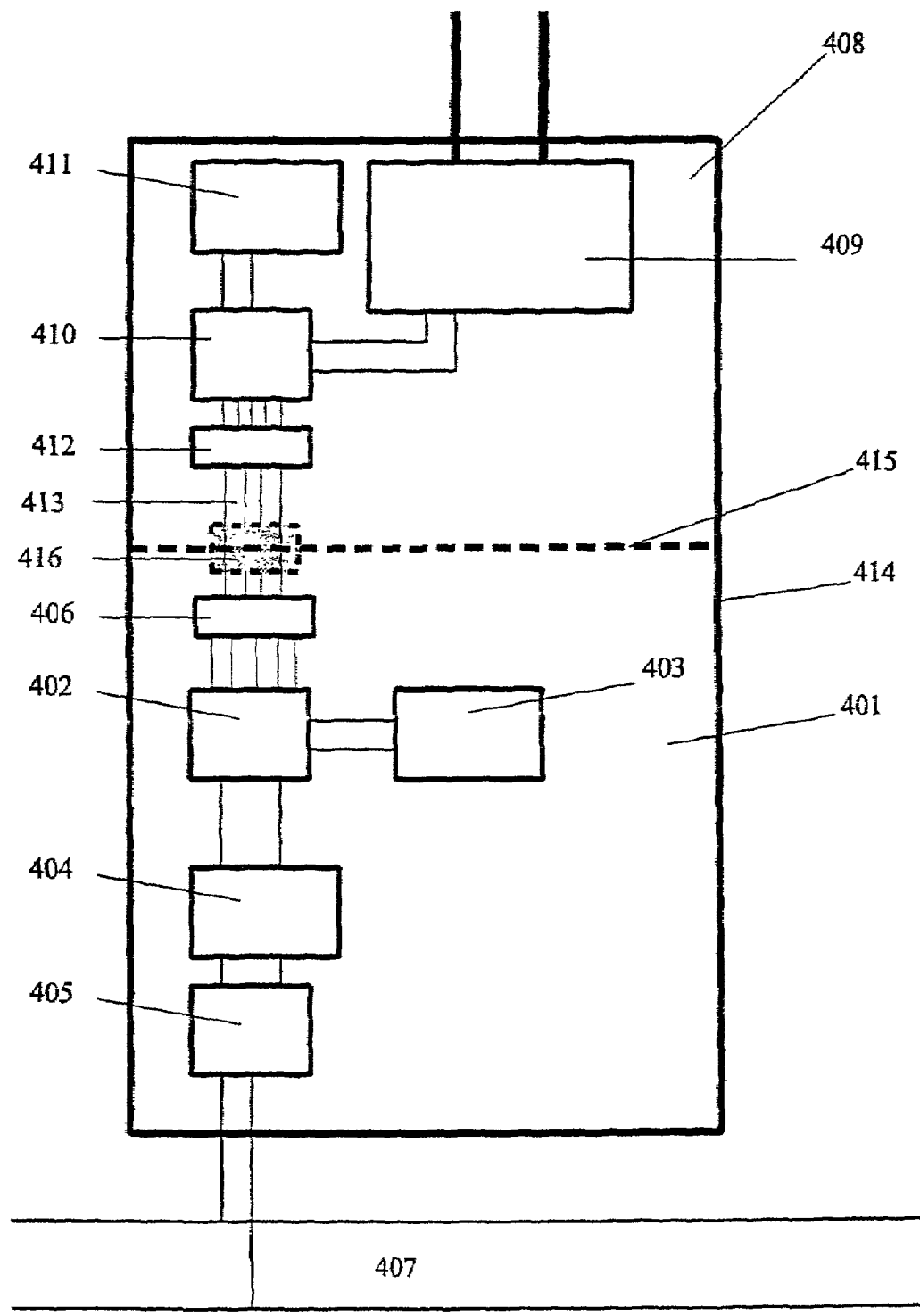
FIG. 4 shows transmitting and receiving units via a radio channel in a radiocommunication system, in which transmission takes place in a protocol distinct from the CAN-protocol and in which conversion to the CAN-protocol is realized on the receiver side.

FIG. 4 shows a monitoring/control unit 401, having one or more CPU's 402, memories 403, a CPU-integrated or free-standing CAN-Controller 404 (for example Intel 527A), a CAN-driver 405 (for example Philips 251A), communication adjustment circuits 406, etc., diagrammatically illustrated, built for the CAN-protocol, which are connectable to a radio unit 408 and also connectable to a CAN-connection 407. The radio unit 408 comprises two communication parts, a radiocommunication part 409 having hardware and software, which enables a wireless communication to be set up between different radio units, and a part having hardware and software, incorporating one or more CPU's 410, memories 411, communication adjustment circuits 412, etc., diagrammatically illustrated, which allows communication with the unit 401. Examples of such radio units are WaveRider from GEC (GB) and examples of a CAN-unit are CANnonBall and mini-CB from KVASER AB (SE). The radio part 408 and the CAN-part 401 have at least one CPU each and can intercommunicate via a serial or parallel interface 413. The parts 401 and 408 can be built together in a common casing 414 or each in its own casing, indicated by 415, and can be connected by a connector 416. An advantage of having the radio unit 408 and the CAN-unit 401 mounted each in its own casing is that the radio unit can be easily exchanged in the event of a fault, replaced by a similar radio unit in order to satisfy national or regional radiocommunication regulations, or can alternatively operate with some other wireless communication based, for example, upon infra-red or visible light, ultrasound, etc. The CAN-part can in this case be a standard unit with a parallel or serial output which allows connection to a unit equivalent to 408. Each radio part has a unique identity, in the case of WaveRider an Ethernet address, and each CAN-unit has a unique identity, for example an European Article Number (EAN) including a serial number. Each unit which will be able to be controlled also has a unique identity, for example an EAN including a serial number.

The radio unit operates independently as regards radio-communication and has a network protocol for this. All radio units can intercommunicate within radio range on a common channel. Two or more radio units can be allocated or can themselves set up a channel which is exclusive to them. If further differentiation of the radio traffic is required, then two or more radio units can establish an exclusive message channel within a channel by the messages being encoded with their own common key. Each station can be allocated a station name constituted, for example, by a binary code or an ASCII-file. By having two separate identification systems, one for radiocommunication and one for CAN-communication, a very secure and flexile communication system can be established in which the system, apart from being a communication system, can also be used to distribute and check the authority of operators to operate machines.

U.S. Pat. No. 5,392,454 describes how two radio units can set up a common exclusive communication channel by first seeking contact with each other via another type of communication channel and by there exchanging information about each other's unique identity. By marking its messages with its identity during ordinary communication, a particular unit can thus filter out those messages which are intended for the unit in question. The fact that the identification of the message is based upon the identity of the radio unit represents a major drawback, firstly in respect of the exchange of radio units and secondly if multicast-type connections are wanted to be set up. The consequence of the solution proposed in patent U.S. Pat. No. 5,392,454 is that the radio connection is tied between the transmitting and receiving radio unit and not between operator unit and machine or between machine sub-system and machine sub-system. The radio communication system can be regarded as the master machine-control system. The radiocommunication units are regarded as special units within the system.

In CAN-systems, for example those operating with CAN ELP (Higher Layer Protocol) "CAN Kingdom", it is usual firstly for each node or module in the system to have its own unique identity, which is based, for example, on an EAN and a serial number, and secondly for there to be a module or node constituting a system node in the machine system. The identity of this node can also be used as identity for the machine. In the present invention, the radiocommunication unit is regarded as a CAN-node of whichever type, equating, for example, to a valve unit or a joystick unit. The radiocommunication system is thus regarded as the subordinate machine-control system. When the system is started up or as soon as a radio unit is connected to the system, the system node can detect this, for example by a method described in CAN Kingdom. Depending upon the situation, the system node can assign to the radio unit a general public network key or a unique key. A simple way of constructing a unique key is to base this upon the identity of some node incorporated in the system, since all of them have a unique identity, inclusive of the system node itself. If, for some reason, a node other than the identity of the system node is chosen as basis for the exclusive network key, then this is entirely possible, at least in systems based upon CAN Kingdom, with maintained system security, since the system node is aware of all integral nodes and no node can be exchanged and work within the system without the consent of the system node. From a security viewpoint, it is vital that it is the system node of that sub-system which is critical to security within the total system which determines the network key and possibly also provides a jump plan or alternatively a dispersion code, depending upon whether a jumping frequency or spread spectrum technique has been chosen. Examples of a suitable radio employing the latter technique is the "2.45 Spread Spectrum Transceiver" from CRL Instrumentation in England. For example, in a system comprising a hoisting crane and a remote control unit, it is the system node in the hoisting crane which has to assign the common network key to a particular radio unit, not any of the radio units or the system node in the remote control unit. Alternatively, network keys can be distributed at a still higher level within the system. For example, a unit which is common to a construction area can distribute network keys via a common channel to remote control units and cranes. The area-common unit then has complete information on all cranes and the identities of remote control units within the area. It is vital that the radiocommunication units should be at a low level systematically within the machine system and hence fully exchangeable without security risk. The problems associated with radio transmission, such as, for example, jump plan, jumping frequency, dispersion code, identification of radio transmitter and receiver, distribution of station identities, etc. can be solved wholly within the radio system range and the machine system constructor needs only to ensure an adequate network key distribution. A hierarchically structured machine system includes an organization for the generation and distribution of network keys and an organized way of identifying individual modules and groups of modules. The radio system includes an organization for the generation and distribution of communication channels and an organized identification of individuals and also possibly groups of radio stations. The fact that the machine system distributes the network keys and has scope to acquire and employ information on the identities of stations forming part of the radio system means that radio-communication in a CAN-system can be used securely. The identity of the station in the radio network can be exchanged by the system node for the identity of the system node, in which case the system ceases to form part of the original radio network.

Having CAN-modules whose only tasks are to constitute units for wireless communication, hereinafter referred to as WCANM, is a major advantage in CAN-systems. An example: We have two wireless units, WCANM1 and WCANM2. In stage one we couple them together via the CAN-connection and they perform the start-up process and can subsequently intercommunicate in a secure manner. In a system which is traditionally constructed, then it is now possible to remove a unit, for example a control lever and monitoring unit, and replace this with a WCANM1. The removed module is now coupled together with WCANM2 and we have a wireless connection between the monitoring/control unit and the rest of the system. In its simplest form, WCANM1 will now receive all messages on the CAN-bus. As and when a message is correctly received, it is repackaged into a WCANN-message [sic] and sent to WCANM2, which unpacks the message and converts it into a CAN-message and sends it to the monitoring/control module. This module cannot distinguish between a message which has undergone these conversions and a message which has arrived directly on the CAN-bus, if the CAN-Identifier is the same. When the control/monitoring module sends a message, the reverse takes place. WCANM2 receives the message, repackages it, transmits it to WCANM1, which repackages and sends out the message on the CAN-bus.

Figure 5:
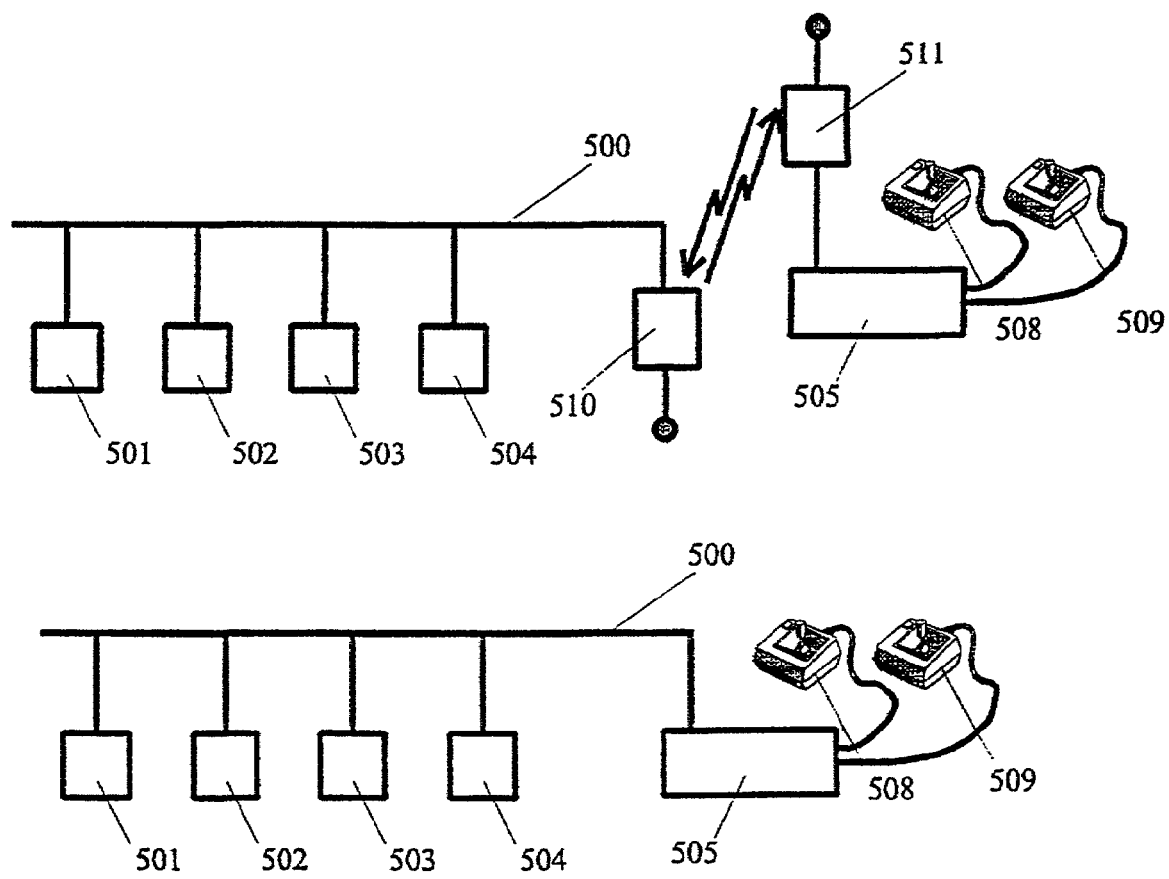
FIG. 5 shows a simple system in which an operator control module which works on the CAN-bus is easily modified from a wire-bound system to a radio-controlled system.

FIG. 5 illustrates a process according to the above. A CAN-system comprises a CAN-bus 500, to which the modules 501, 502, 503, 504 and 505 are connected. The module 505 is a control module to which the control levers 508 and 509 are connected and with which the control command can be given to 501 and 502 or 503 and 504 respectively. By decoupling the module 505 from the CAN-bus 500 and instead connecting up the radio module 511 and connecting the radio module 510 to the CAN-bus instead of the module 500, a wireless connection has been obtained between the control module and the CAN-bus.

Figure 6:
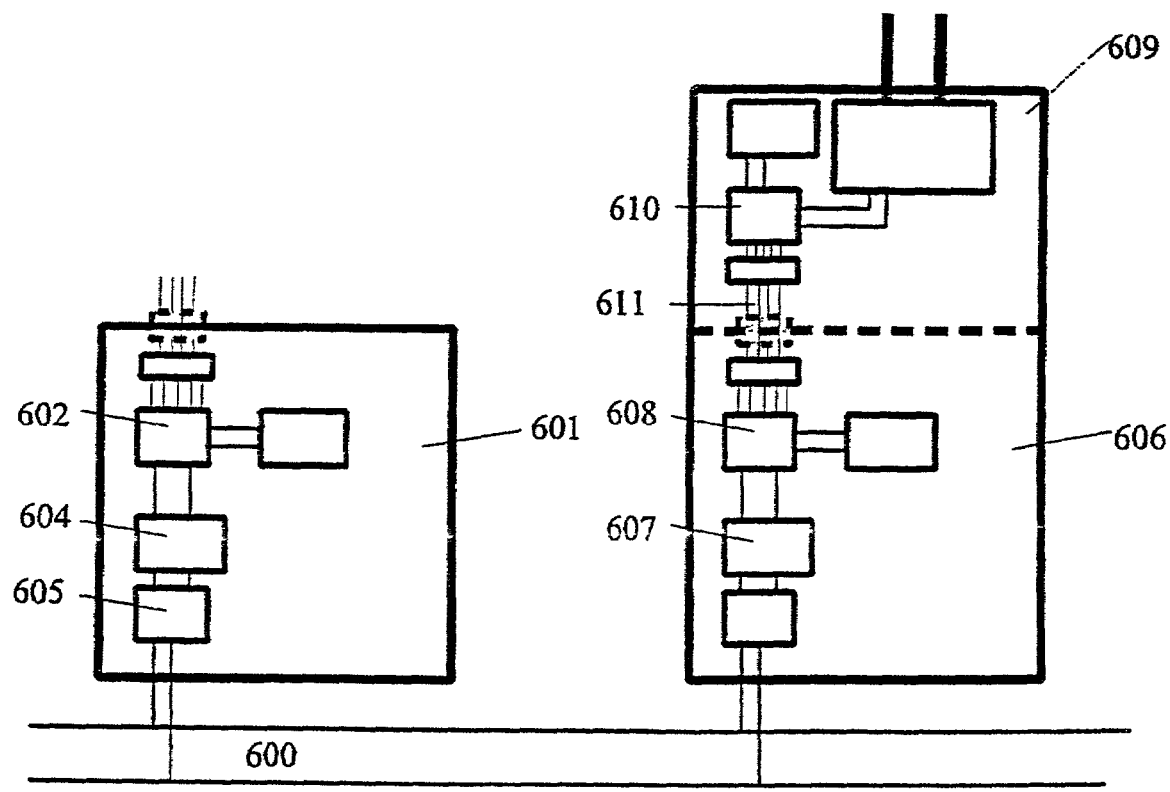
FIG. 6 shows a device which enables a CAN-message to be converted to a radio message, and vice versa.
Figure 7:
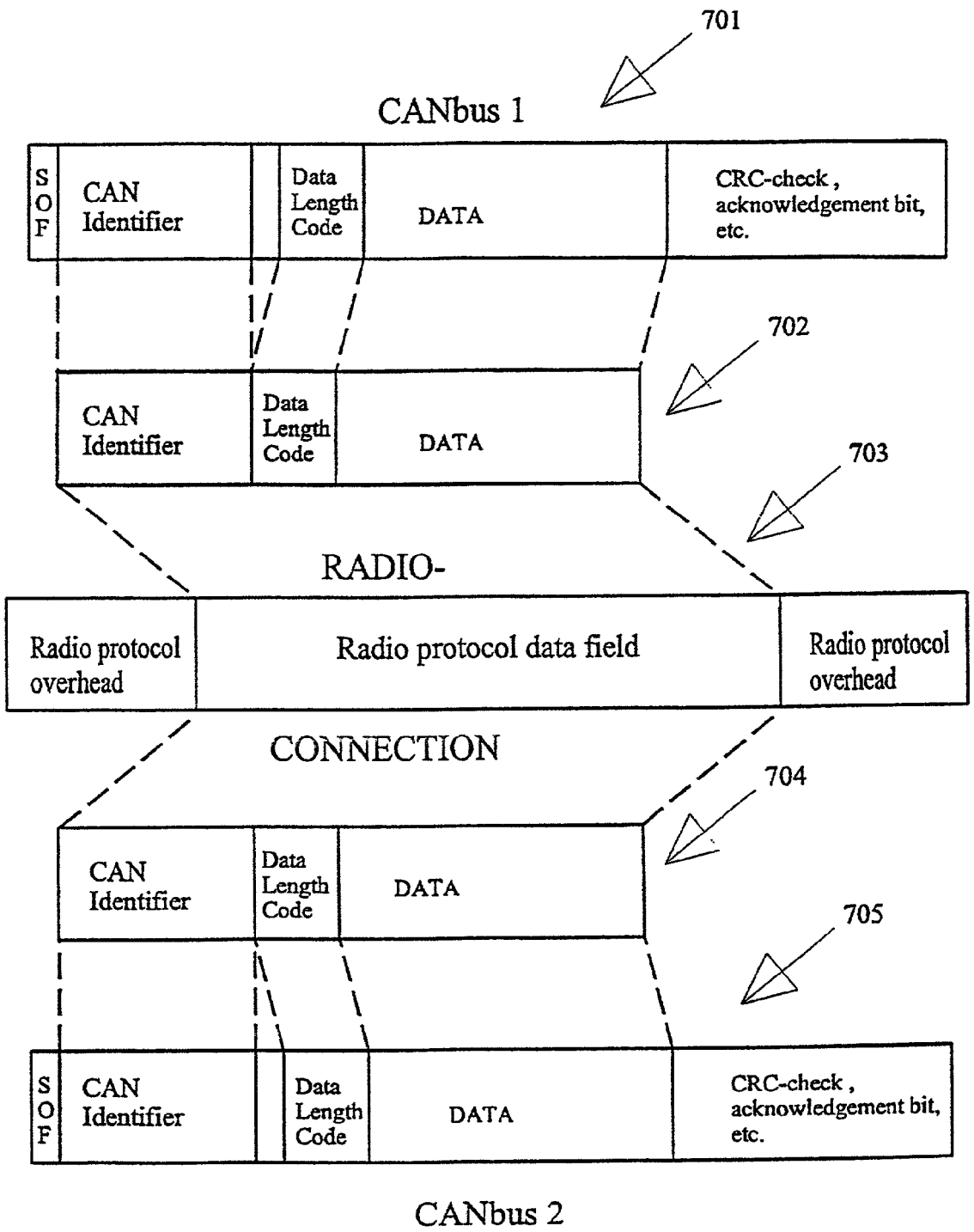
FIG. 7 shows diagrammatically how protocol exchange takes place between the CAN-protocol and a radio protocol.

Below and in FIG. 6, a detailed account is given of how a CAN-message is converted into a radio message and vice versa. A message is created by the CPU 602 in module 601 and transferred to its CAN-Controller 604 for dispatch. Apart from data, the CPU sends information on the CAN-Identifier to which the data is to be coupled, on whether this identifier is of the standard or extended type, on the fact that it is a data message and not a so-called "remote request" and on the number of bytes which the data occupy in the data field. The CAN-Controller converts this information into a bit pattern according to the CAN-protocol, in which, inter alia, a CRC check code for the message is worked out, and transmits the bit pattern 701 (in FIG. 7) on the CAN-bus 600 according to the rules of the CAN-protocol via the CAN-driver 605. Once the CAN-Controller 607 of the WCANM-module 606 has correctly received the message, then information corresponding to the CPU in module 601 is downloaded to its CAN-Controller (604) so as to be accessible to the CPU 608 of the WCANM-module. This reads the received information and packages it into a data format which is common to WCANM-modules:

| | |
|---|---|
| Bytes 0–3 | CAN-Identifier |
| Byte 4 | Data Length Code |
| Bytes 5–12 | Data Field 20 |

Note here that a CAN-Identifier is only a bit pattern and that the arbitration characteristic associated with this part of a message according to the CAN-protocol is of no importance to the radio transmission and that the Cyclical Redundancy Checking ("CRC") code and acknowledgement bit are not transferred. The data string 702, in FIG. 7, according to the above is transmitted to the CPU 610 of the radio unit 609A via a local serial or parallel bus 611 for sending. (The interface 611 can comprise eight leads for data, six leads for handshaking, three in each direction, and a feedback signal lead for initiating the radio at the start-up of the system). The CPU 610 then deposits the data string as data according to the protocol used by the radio units amongst themselves 703. Here the data are treated as whichever data and the CPU 610 is not therefore required to have any information on the CAN-protocol. The radio message having been transmitted, the CPU in the radio unit of a receiving WCANM-module, following receipt according to the radio protocol, uses the local bus to transmit the received data string 704 to the CPU of its module's CAN-part. The CPU of the CAN-part then creates a CAN-message 705 in accordance with the format of the data string and presents this to its CAN-Controller for dispatch on the CAN-bus and the process continues in the customary CAN manner. The CAN-Controller calculates a new CRC check code and presents a one in the acknowledgement slot, since it is transmitter of a message which is new to this part of the system.

In CAN-systems constructed with CAN Higher Layer Protocol "CAN Kingdom", an application in a module is tied together with a CAN-Identifier via a so-called "Folder" to allow the data exchange between applications in different modules to be coupled together. If the CAN-system is constructed according to CAN Kingdom, the Folder number can be used instead of the CAN-Identifier in the format of the data string 702 and the Data Length Code omitted:

| | |
|---|---|
| Byte 0 | Folder Number |
| Byte 1–n | Data n = 0 . . . 8 |

Other necessary information derives from the particular "Folder Label" in accordance with the CAN Kingdom protocol. The length of the ether-borne message is thereby reduced. Furthermore, different CAN-Identifiers can be used for the very same message in the various sub-systems. This can be an advantage, since the priority of the message can then be adjusted to the conditions in the particular sub-system. In systems developed for radiocommunication, only messages necessary to a particular receiver are sent via radio and each subsystem has an internal flow of messages between its nodes.

In CAN-systems it often happens that modules are set to receive only certain messages. This is generally done by filtering out certain bit patterns in the arbitration field of the CAN-protocol, which in specification ISO 11898 is known as the Identifier Field. Since, from a CAN viewpoint, WCANM-modules can be quite ordinary CAN-modules, these also have the scope to filter out messages on the bus. If it is known which messages are to be received on both sides of the wireless communication, then WCANM1 and WCANM2 respectively can be set to filter out those messages which are to be received on the respective other side and thereby reduce the load on the wireless connection. Since there is no known method of satisfying the time demands which are placed upon the acknowledgement bit of the CAN-protocol via a wireless connection with a high bit speed, typically 125 kb/s to 1 Mb/s, over longer distances, typically from a few meters up to five hundred meters, the wireless communication is not bit-synchronous with the line-bound communication. Since the CAN-protocol is not followed in ether transmission, this can often be done faster and with different scheduling of the message transmissions. If standard circuits for CAN are used, then it may be expedient to take the message as it appears in the normal reception buffer which is read by the CPU, i.e. with CAN ID field, control field and data field, but without start bit, stuff bits, CRC bits, etc., and to transmit this according to a protocol suitable for wireless communication. Another alternative is to receive from the CAN-bus entire bit streams and to buffer these as far as the acknowledgement bit. When this is read to zero on the CAN-bus, the packet is transmitted via the ether and, following receipt, the bit stream is transmitted on the CAN-bus on the reception side. From the acknowledgement bit onwards, the receiving WCANM-module itself creates remaining bits according to the CAN-protocol. If, during this period, the first WCANM-module reads an error frame after the acknowledgement bit during the remaining part of the CAN-message, then an error code is immediately transmitted to the receiving WCANM-module, which then sends out an error frame on its CAN-bus. This is an effective way of sending CAN-messages, since CAN's error controls are utilized (and therefore no error control is required in the ether protocol) and there are few bits needing to be transmitted. The problem remains however, when some bit is incorrectly received from the ether or, worse still, a CAN-error arises on the CAN-bus belonging to the receiving side. It can then be too late for the receiving WCANM-module to send an error message over the ether. The original message can already have been accepted on the sending side. This problem can be solved in the CAN Higher Layer Protocol.

A further way of compressing the message which can be utilized, especially when the ether communication is operating at high bit speed, is for the bits of the CAN-message on the sending side to be received up to the point where the CRC-code and the stuff bits are removed, since these are not involved in the working-out of the CRC-code by the CAN error protocol. This packet is transmitted via-the ether and, if the CRC-code is correct on arrival, then a CAN-bus is recreated.

The communication between WCANM-modules [sic] can be of the full duplex or half duplex type. Full duplex offers the fastest transfer, since, if the receiver detects an error, it can immediately send back an error message to the transmitter. In the case of half duplex, the receiver would have to wait until the whole message is sent before a reply can be given. Radio networks are most commonly of the half duplex type. A typical sequence is as follows:

| Transmitter | Receiver |
|---|---|
| 1. Set up connection. | 2. Acknowledgement |
| 3. Sends message | 4. Acknowledgement |
| 5. Disconnect the connection | |

A more effective procedure is to send short messages constantly to and fro between the transceivers. A CAN-message is always short in comparison to necessary information in a radio network protocol for the 2.4 GHz band (the ISM band), in the order of magnitude of 11 to 154 bits depending upon the way in which the information is packed in the radio protocol. It is therefore expedient for the CAN-information to be included in the "Establishment of connection" message and the acknowledgement message, thereby providing an effective use of the channel. The fact that a short message is "ping-ponged" in this way means that a system-supervising node in the CAN-system has the chance to have continuous information stating that the radio connection is intact and functioning. A broad-band communication further requires that the clock in a particular transceiver module shall in some way be synchronized with a real or virtual system clock. A constant exchange of short messages between stations in the system allows good precision to be maintained in the system's clocks, thereby enabling the creation of an effective broad-band protocol built on jumping frequency or bit-pattern synthesis and enabling the clock of the radio system also to be used as a system clock within the CAN-system.

An ever increasing number of modern weaving looms are constructed with a CAN-system. Each weaving loom has a display, a key set and very often also a memory card reader. These devices are utilized only when a person operates them, i.e. for the vast majority of the time they are totally redundant items of equipment. It is usual for one person to have responsibility for twenty or so weaving machines. Often all weaving machines are connected to a network having a supervisory function and the person in charge acquires information telling him which machine to go to in order to carry out some form of service. By connecting WCANM-modules to each weaving machine and a WCANM-module to a portable unit suitable for passing and taking information from a person, a so-called "Man Machine Interface (MMI), for example a portable personal computer, a number of advantages are attained. All displays, key sets and memory card readers can be removed. When the person stands at the machine, he connects his MMI to the CAN-network in the manner previously described. Since only one MMI is required per person, this can be considerably more powerfully designed than if there were one to each machine. Data files which were previously transferred using memory cards can now be transmitted from the MMI. Fault analysis programs, graphic presentation, tuning tool programs, etc. can be incorporated in the MMI and keyboards, mouse, etc. can be made user-friendly and upgraded more regularly than the machines. Communication with the person often draws on greater computer resources than the machine-control function, so that the machine-control function can be made cheaper, more secure and more effective in that these functions are taken over by the MMI.

When the operator is not directly connected to a machine, he is connected to the wireless network. As soon as a machine requires action on the part of the operator, the machine sends out a message on the wireless network. The operator brings up on his display a list of all weaving machines which have requested assistance and for what reason. If more than one machine has requested assistance, the operator can choose the order in which he shall attend to the machines and he is also prepared for what has to be done so that he has suitable tools with him.

Figure 8:
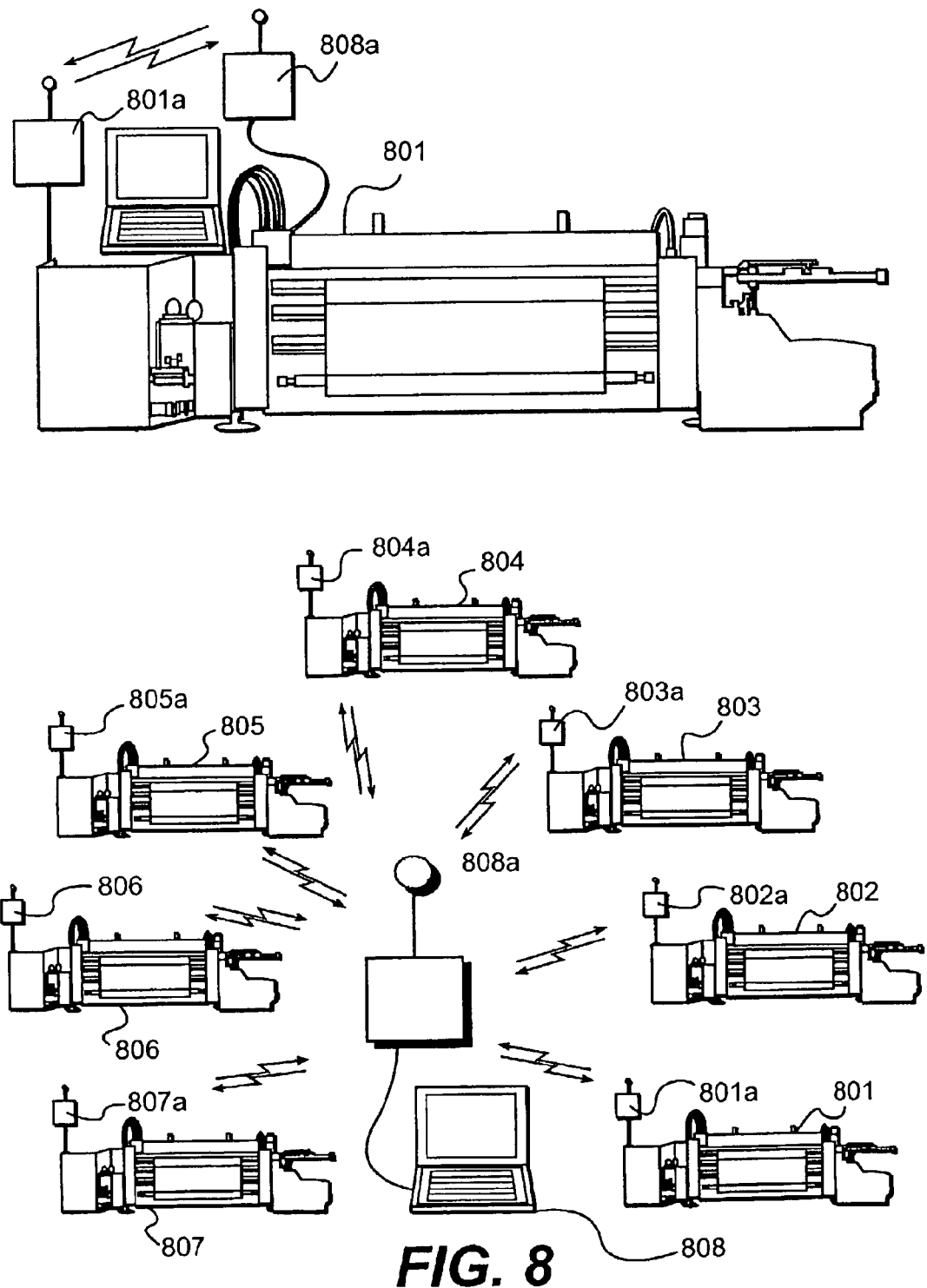
FIG. 8 shows a radiocommunication control system in respect of a machinery stock, e.g. in the form of weaving looms in a weaving shed.

FIG. 8 shows a diagrammatic representation of a device according to the above. Each weaving machine 801, 802, 803, 804, 805, 806, and 807 is equipped with radio modules 801*a*, 802*a*, etc. and has in each case an internal CAN-control system which can communicate with the radio module. The operator has a PC 808 to which a radio unit 808*a* is connected. When the operator is supervising the plant, all radio units operate on the same channel and information can be exchanged between the PC and all weaving machines. When the operator is working on a weaving machine, the PC and the weaving machine use an exclusive channel, direct communication with the weaving machine 801 being illustrated in the figure. A further advantage is that the wireless network can replace the currently wire-bound network for production data to and from the machines and for supervision thereof.

Figure 9:
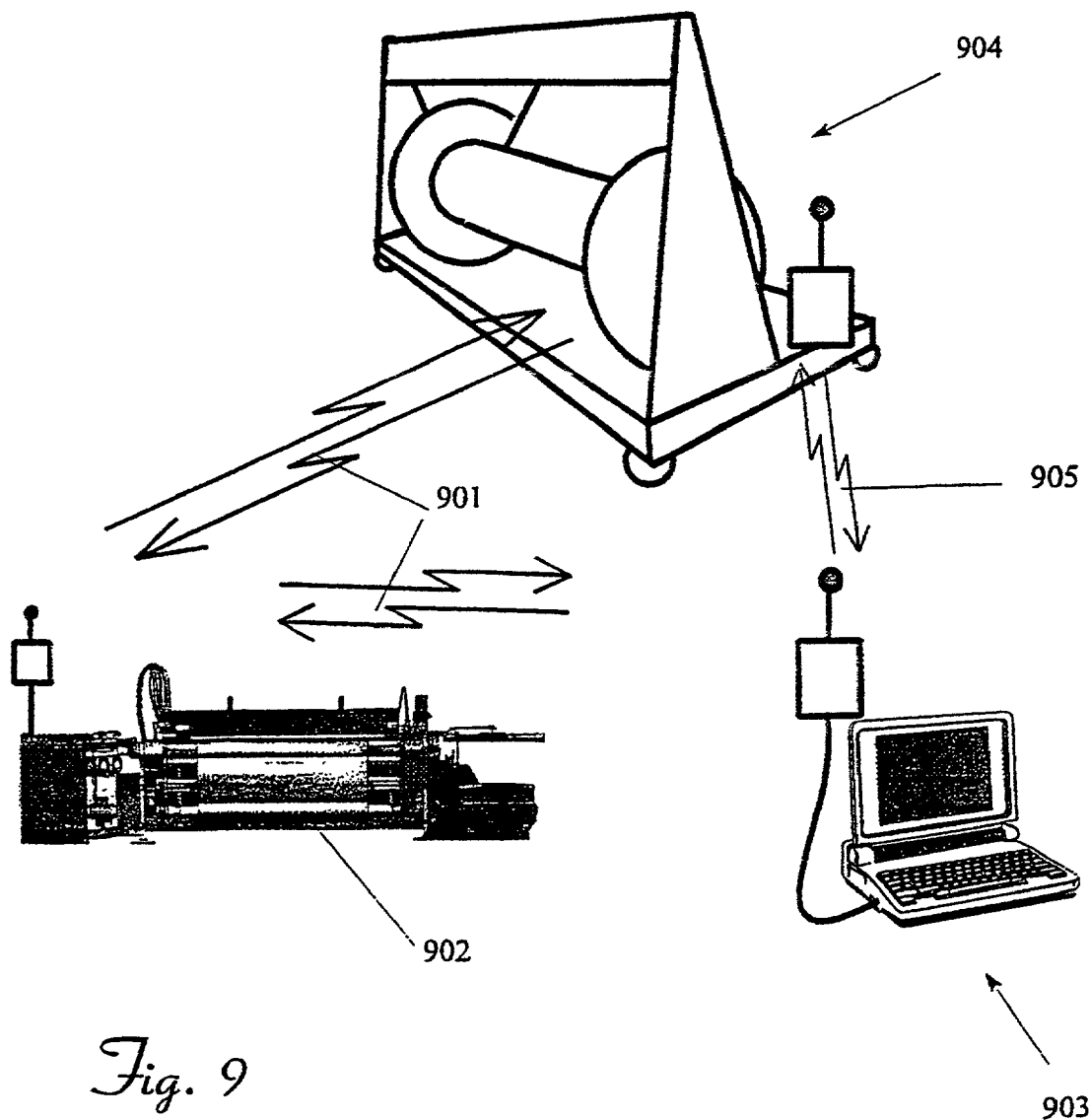
FIG. 9 shows an arrangement for weaving machines in a weaving shed, in which information goes out to a service car in parallel with a control panel.

The automation of a factory often incorporates various types of driverless trucks and similar equipment which also have an internal CAN-control system. These can also be connected up to the wireless system. FIG. 9 shows a diagrammatic representation of a small part of such a system with a weaving machine 902, a driverless truck carrying a replacement beam 904 and an operator unit 903. If, for example, a warp beam is to be replaced, then a message 901A reporting this can pass from the weaving machine 902 both to the operator 903 and to the unit 904 transporting replacement beams. This, in turn, can send a message 905A to the operator about its status. When the operator arrives at the machine, the driverless truck with the replacement beam is already there. In the event of further automation, the fixed machine interacts automatically with the moving machine and the operator is summoned only if the machines, for some reason, have failed in their task.

Figure 10B:
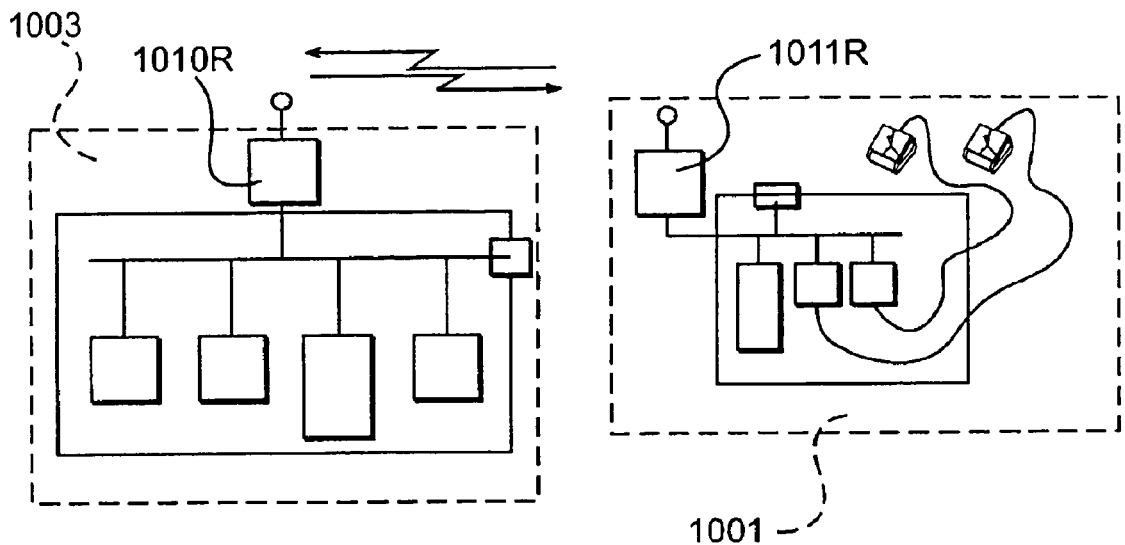
FIGS. 10a and 10b illustrate a simple way of setting up a secure radiocommunication between a control member and a machine in the example arrangement of FIG. 9.
Figure 10A:
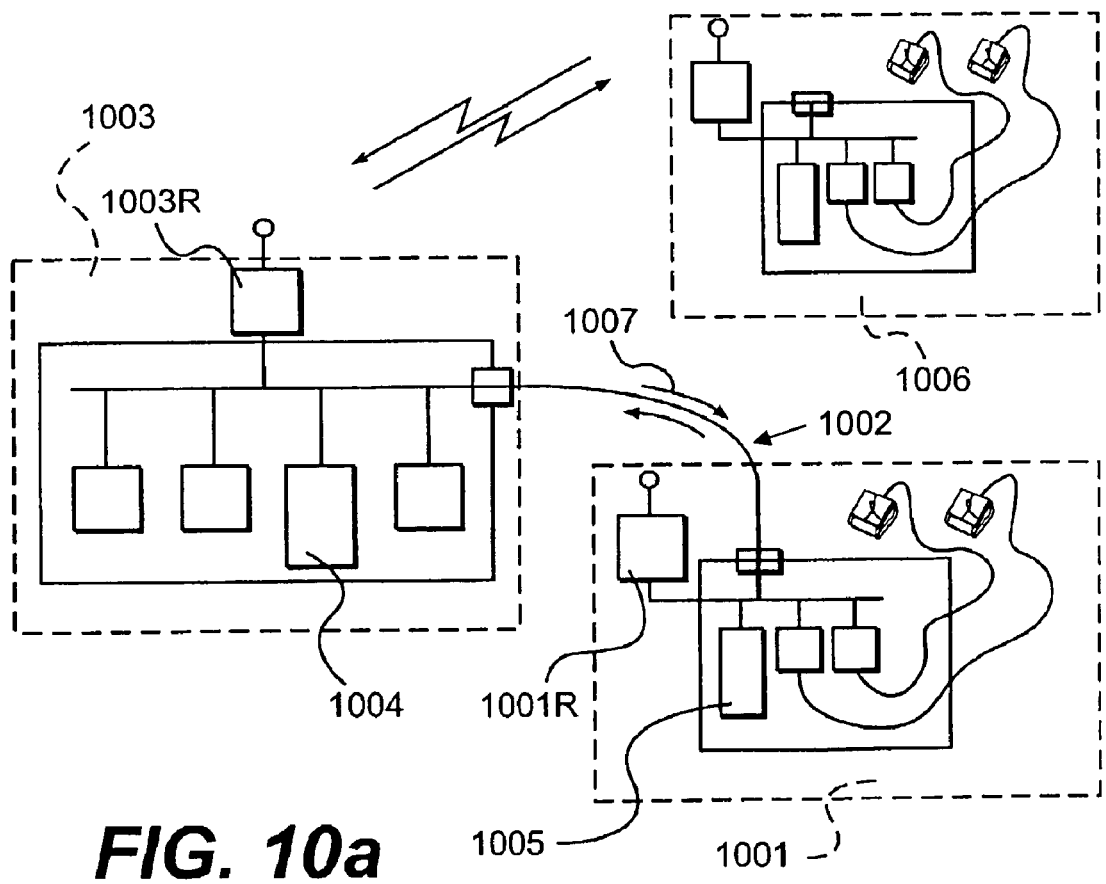

FIGS. 10*a* and 10*b* show an example of the above process. A monitoring/control unit 1001 equipped with a radio unit 1001R is connected via a CAN-bus 1002 to a machine 1003 equipped with a radio unit 1003R. The system-supervising node 1004 of the machine detects that a monitoring/control unit 1001 is connected to the machine and asks the system node 1005 of the unit 1001 for the EAN and serial numbers of the monitoring/control unit and uses these to check whether the unit 1001 is of the right type and whether the individual is authorized to control the machine 1003. The method for carrying out such a check is, inter alia, described in CAN Higher Layer Protocol "CAN Kingdom". If another monitoring/control unit 1006 already has control over the machine, the connected unit 1001 is denied further communication with the system in the machine 1003. If no previous monitoring/control unit has control and type and possibly also the new individual is authorized to control the machine, then the machine transmits a unique station name 1007, for example the EAN, inclusive of serial number, of the unit 1001. This station name is subsequently used jointly by the machine and the monitoring/control unit as identity for their communication channel. The CAN-connection 1002 is disconnected and communication can be made via radio as shown in FIG. 10*b*. FIG. 10*b* has revealed that the radio units 1001R and 1003R have been exchanged for the compatible units 1011R and 1010R after communication has been established. This is totally feasible by virtue of the fact that a particular system node 1005 and 1004 delivers the agreed channel code to the respective new radio units, once these have been connected to the respective CAN-network.

Figure 11:
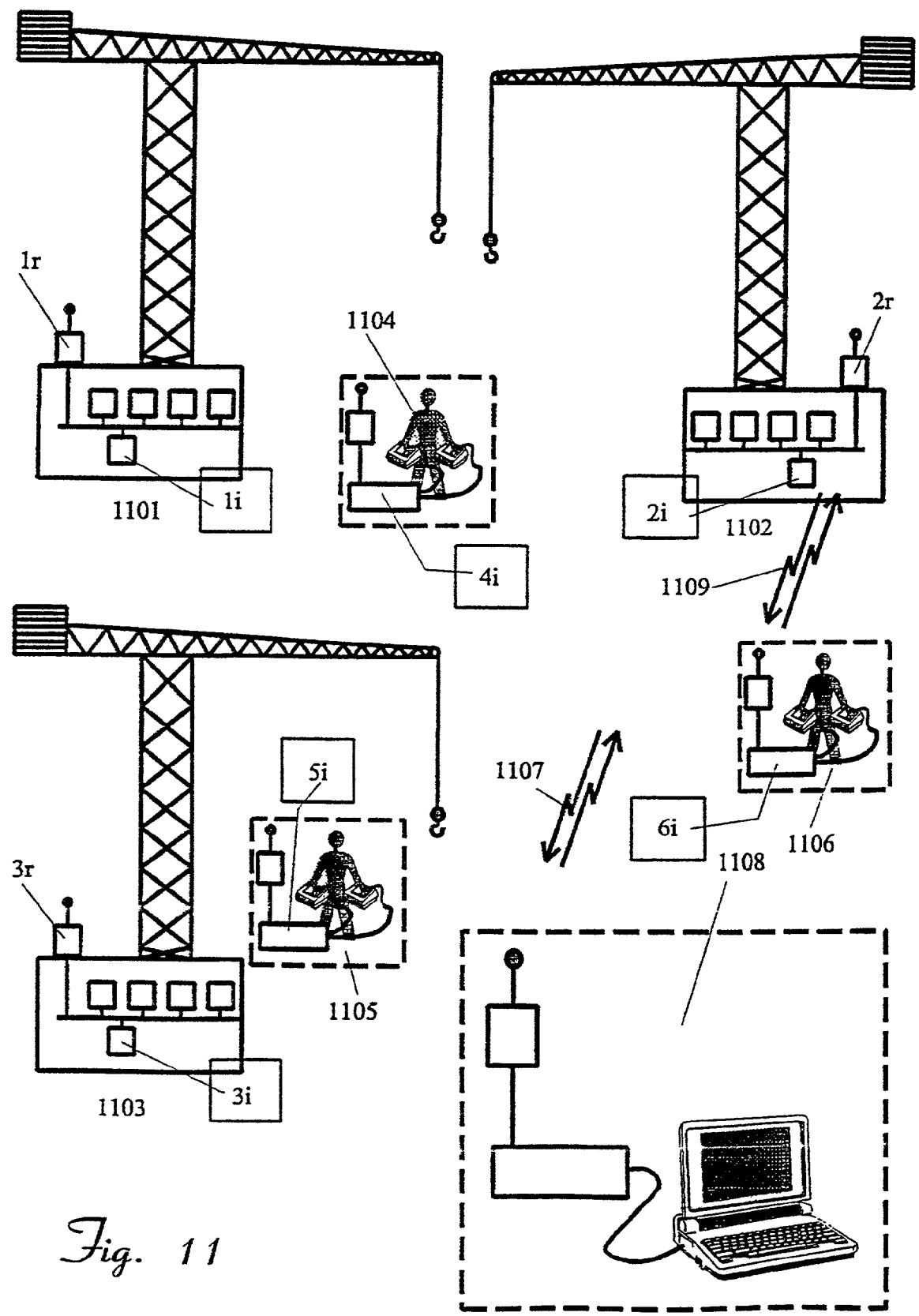
FIG. 11 shows a construction site with radio-controlled cranes and the establishment of a radio connection between these and a particular operator.

FIG. 11 shows a more complex process. A company has a number of cranes 1101, 1102, 1103 at a work site. All cranes have a unique identity, 1*i*, 2*i*, 3*i* and are each equipped with a radio unit 1*r*, 2*r*, 3*r*. Each crane operator 1104, 1105, 1106 has his own monitoring/control unit with radio. Each such monitoring/control unit has a unique identity, 4*i*, 5*i* and 6*i* respectively. Whenever a crane does not have active connection with a control unit, it listens in on a channel 1107 which is common to the work site. Whenever a crane, in this instance the crane 1102, is assigned to a crane operator, in this instance 1106, a central radio unit 1108 seeks contact with the assigned crane 1102, which is identified by 2i, and informs the crane operator 1106 of the identity of the monitoring/control unit, 6i or alternatively the network key based on 6i. Once the crane operator is on the spot, he starts up his monitoring/control unit. The crane unit seeks contact on the general channel with the selected monitoring/control unit 1006 having the identity 6i and when they have made contact with each other the crane reports its identity 2i and the fact that it is master of the connection. A connection is then set up on an exclusive channel 1109, i.e. the crane communicates how frequency jumping is to be done. In brief, it is therefore the case that cranes which do not have contact with a selected control unit, in terms of radiocommunication, comply with the jumping frequency from a central unit. Once contact is obtained with a selected monitoring/control unit, the crane establishes contact with this, leaves the central unit and assumes control over the generation of frequency jumping. The monitoring/control unit complies with this. If the radio connection is of the "spread spectrum" type, then the dispersion code is given instead of the jump plan.

A plurality of control units can be assigned to one and the same crane. They then belong to the same network. In the working range of the crane, a particular monitoring/control unit is assigned to a part-region. The part-regions can be partially overlapping or the crane can follow a predetermined path between the part-regions. The crane is thereby able to be reliably controlled at a number of sites. When the load enters into a part-region, it obeys only that control unit which is responsible for the area. There are a number of ways of solving the allocation of who has control over the machine on a given occasion. A further alternative is that the machine, after a certain period in which no control command is forthcoming, for example two seconds, accepts that particular transmitter, of those which are accepted, which first issues the control command. The machine then obeys this transmitter until such time as it has failed to give any control commands for a two second period.

In systems, especially those which are constructed according to the principles contained in CAN Kingdom, in which a plurality of remote control units are able to operate one and the same unit, control commands from a particular remote control are assigned to a CAN-Identifier by the system node of the controlled unit. The control commands are in this case first received by the system node, which, in turn, transmits control messages on the CAN-bus of the machine. The system node can receive control commands from all remote control units which communicate on the network key common to the machine and can then select which remote control unit's control commands will be implemented according to a set of rules, for example the work area within which the unit is situated or, quite simply, that the remote control unit which first gives a shift command then retains control until it issues a code for relinquishment of the control, is shut off or remains inactive for a predetermined period. Thereafter, the system node of the machine waits for a first best command from any of the authorized remote control units and then executes control commands only from this latter until the particular remote control unit hands over control according to the above.

In a number of machines, for example process machines, a large number of measuring points and adjusting appliances are apparent, which are geographically dispersed and on many occasions poorly accessible. The operator sits in a room in which he supervises and controls the entire system via VDU's. Whenever something is detected which calls for on-the-spot observation, a communication problem arises. For example, a closed position of a valve is indicated, which should be open. When the operator makes an on-the-spot visual inspection, he sees that the valve is open. Has it opened whilst he was on his way to the valve or is the valve signaling a closed position despite the fact that it is open? If now a WCANM-module [sic] is connected and he has a MMI as previously described, then he can read on the spot the message which the valve is transmitting on the CAN-bus and decide whether there is a fault with the valve or not. The WCANM-module connected to the CAN-bus, from the viewpoint of the CAN-signal, can be in a totally passive mode, i.e. not transmitting a single bit, not even an acknowledgement bit. It can also have a CAN-active mode, so that the operator from his MMI is able to command the valve to open or close so as to monitor its functioning there on the spot. Of course, the control system for the process plant would have to be made such that the operator's actions do not jeopardize the security of the process.

Figure 12:
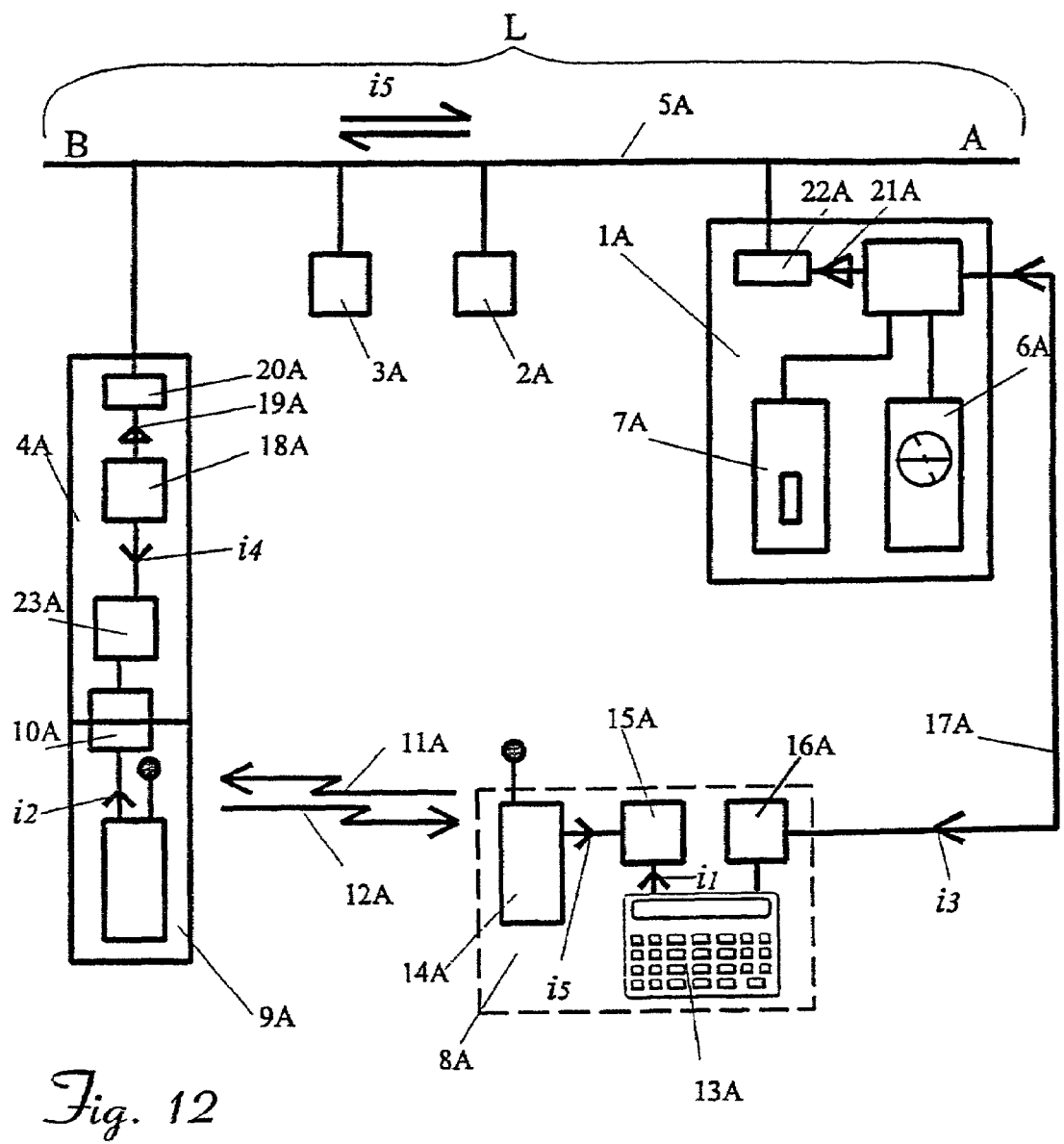
FIG. 12 represents a basic and block diagram of a CAN-system in which radiocommunication equipment parts are arranged at first and second modules in the system and in which the radiocommunication equipment has been connected to the second module in order to simulate stimulations therein, the effect of which upon the system can be monitored at the first module.

FIG. 12 illustrates a machine-control and/or process-control system with its modules 1A, 2A, 3A and 4A, which are intercommunicable via a serial digital connection 5A in a manner which is known per se. In order to simplify representation, the designation "CAN-system" is applied to this system. According to the invention, the module serves aggregates forming part of the said machine-control system and/or process-control system. In FIG. 12 a valve in the aggregate is indicated by 6A and a thermometer in the aggregate by 7A. The length L of the connection 5A can be relatively long and can stretch over 200 m, for example. The modules and aggregates in the system can also be situated out of sight of each other.

In systems of this category, there is a need to be able to initiate a fault-searching, testing, control operation, etc. at the first module 1A. Such fault-searching or equivalent can require that second modules in the system need to be stimulated or need to establish signal transmissions or signal receptions at certain stages of the fault-search or equivalent. In order to save staff, a radiocommunication apparatus is used, comprising two radiocommunication equipment parts 8A and 9A. The first part 8A can be independent from the CAN-system, whilst the communication part 9A is connected to or forms part of the second module. The connection between the part 9A and the module 4A can herein be made via a connection 10A, which can consist of a physical connection, non-galvanic connection, wireless connection, etc. The module 4A can be temporarily or permanently connected to the CAN-bus. The radiocommunication equipment 8A, 9A operates, where appropriate, with two-way connections 11A, 12A. The communication equipment 8A, 9A can in this case utilize one or more channels, with use preferably being made of radio channels in the broad-band range, i.e. in the range of frequencies above 1 GHz, for example the ISM-band. The radiocommunication equipment part 8A is provided with a control panel 13A, which can be of a type which is known per se. The panel is connected to the transmitting and receiving unit 14A of the part 8A, which incidentally can be of identical type to 9A, via an adjusting unit 15A. As a supplement thereto, the panel can be directly connected to the aggregate or components served by the first module 1A. This connection is effected via a second adjustment unit 16A and the connection per se is symbolized by 17A.

An initiation i1 at the panel 13A induces an activation of the transmitting part 14A, which, via a channel 11A, transmits the activation to the radio receiver part 9A. This receipt gives rise to a signal generation i2 to the module 4A via an adjustment unit 23A. The module contains a microprocessor 18A, which causes a signal message 19A to be generated, which is then transmitted to the connection 5A via the communication circuit 20A of the module 4A (see FIG. 1). The transmission can be made according to an order of priority which is determined by the CAN-protocol and in which the module, after admission to the connection 5A, is able to transmit the message in question to the first module. Once the message 19A is received in the first module, a functional stimulation of the component 6A, 7A or the equipment in question is realized, which functional stimulation is provoked by the initiation i1 at the control panel. The control operation can in this case comprise a reversal of the valve 6A, a raising or lowering of the temperature 7A, etc. The said reversal or temperature change can be visible to an observer at the first module. Through stimulations of his control unit 13A, the observer is therefore able to obtain visual evidence of whether the control system in question is accomplishing what it is meant to. At the control unit 13A, information 13A can also be obtained from the components or aggregate served by the module 1A. By keeping the radiocommunication equipment connected, registration and viewing can be carried out for shorter or longer periods of time.

Figure 13:
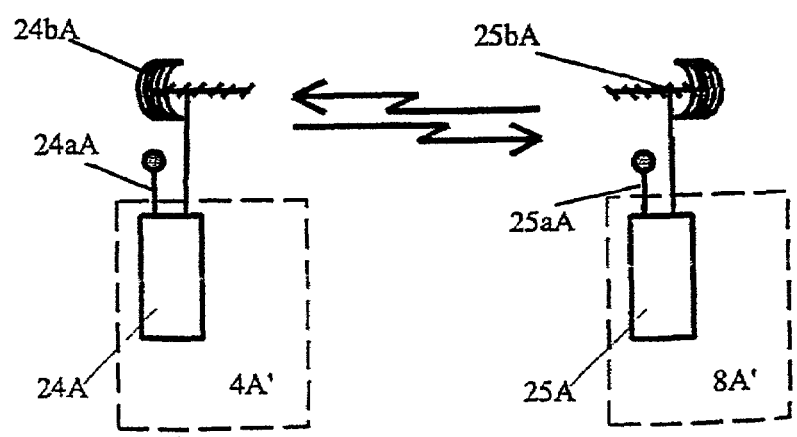
FIG. 13 shows in basic representation an antenna system for long transfer distances in respect of equipment according to FIG. 1.

Alternatively, a manual, electrical or other stimulation of the components or of the aggregate served by the first module 1A can initiate a message 21A generated in the first module, which message is transmitted to the second module 4A via the communication circuit 22A in the first module and the connection 5A. The said signal message 21A induces a signal initiation i4 in the second module and activation of the transmitter part in the radiocommunication equipment part 9A. Via a channel 12A, the information in question is transmitted to the receiving part in the radiocommunication part 14A and thereupon gives rise to the generation of an information signal is to the adjustment unit 15A, for onward conveyance to the control unit 13A or an information-supplying unit at which the information is displayed or registered. A location or site for the first module 1A is indicated by A, whilst a corresponding location or site for the module 4A is indicated by B. After the operator has carried out a check or fault-search at module 1A, he can proceed to module 3A, for example, and carry out equivalent work, providing that the module 4A is kept connected. He does not in this case need to connect any equipment to the CAN-bus, but can continue to use the radiocommunication equipment 9A to transmit suitable messages and receive chosen messages on the CAN-bus, via the still connected units 4A and 9A. For communication over very long distances, up to a few kilometers, it may be necessary to have directional receiving antennae in order to satisfy standards relating to maximum transmitted power. FIG. 13 shows such an arrangement for radiocommunication units of previously described type, 24A and 25A, which are each equipped with an omnidirectional transmitter antenna 24bA and 25aA respectively and a directional antenna 24bA and 25bA respectively. Other equipment in FIG. 1 is symbolized by 4A' and 8A'.

Figure 14:
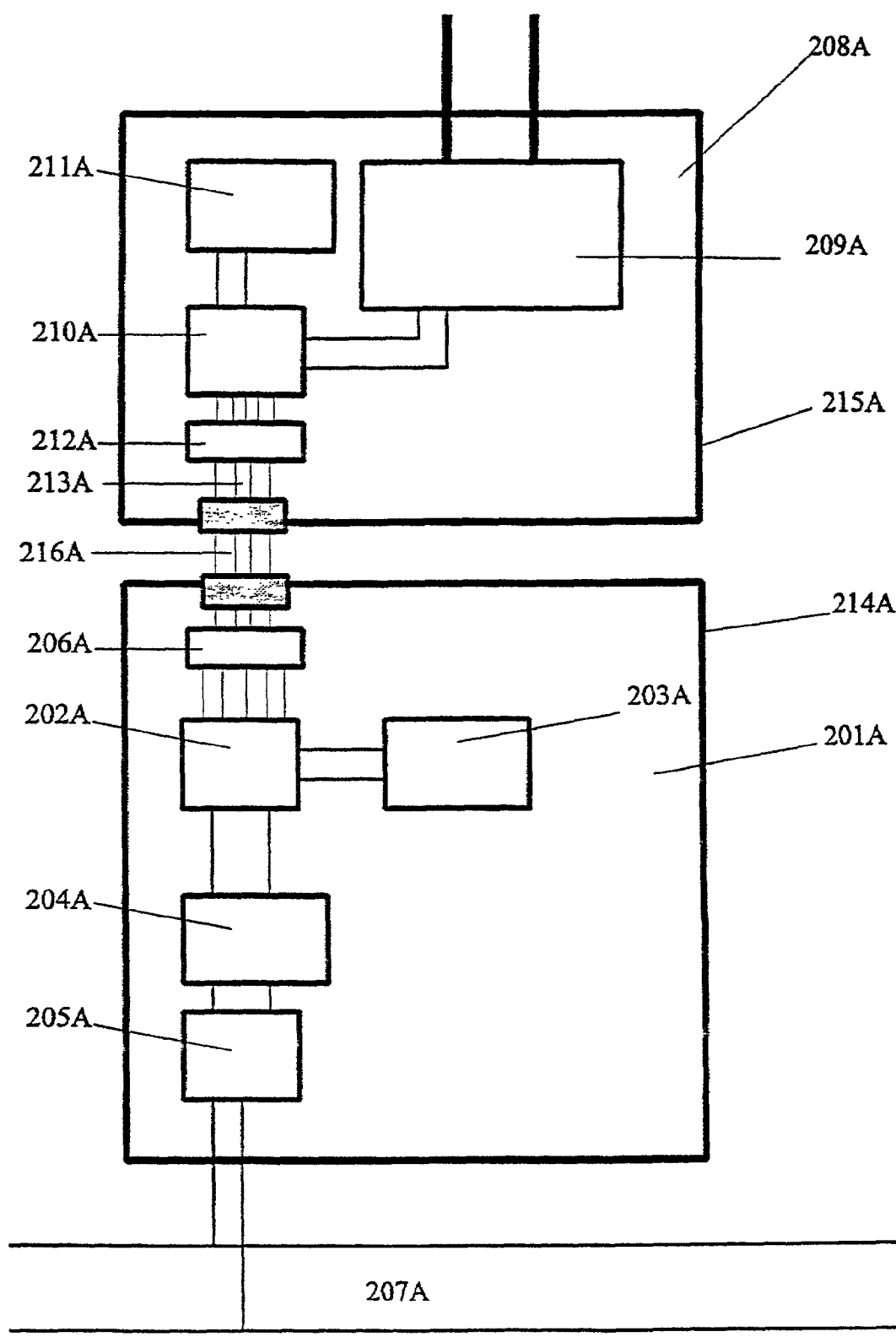
FIG. 14 shows in block diagram form the structure of the module 4A according to FIG. 1.

FIG. 14 shows a diagrammatic representation of is a monitoring/control unit 201A, having one or more CPU's 202A, memories 203A, a CPU-integrated or free-standing CAN-Controller 204A, a CAN-driver 205A, communication adjustment circuits 206A, etc.

The unit 201A is built for the CAN-protocol and is connectable firstly to a radio unit 208A and secondly to a CAN-connection 207A. The radio unit 208A comprises two diagrammatically illustrated communication parts, a radio-communication part 209A having first hardware and software, which enables a wireless communication to be set up between different radio units, and a second part having hardware and software, incorporating one or more CPU's 210A, memories 211A, communication adjustment circuits 212A, etc., which allows communication with the unit 201A. Examples of such radio units are WaveRider from GEC Plessey (GB) and examples of a CAN-unit are CAN-nonBall and mini-CB from KVASER AB (SE). The present invention can be implemented using these standard units. The radio part 208A and the CAN-part 201A have at least one CPU each and can intercommunicate via a serial or parallel interface 213A. The parts 201A and 208A can be built together in a common casing or, as in FIG. 5, can be applied each in its own casing 214A and 215A, and can be mutually connected by a connector 216A. An advantage of having the radio unit 208A and the CAN-unit 201A mounted each in its own casing is that the radio unit can be easily exchanged in the event of fault and replaced by a similar radio unit in order to satisfy national or regional radiocommunication regulations The CAN-part can in this case be a standard unit with a parallel or serial output which allows connection to a unit equivalent to 208A. If WaveRider is chosen as the radio part, the interface 213A will consist of eight lines for data; a so-called "data bus", six lines for handshaking (three in each direction) and one line for a feedback signal for initiating the radio when the system is started up. Each radio part has a unique identity, in the case of WaveRider an Ethernet address, and each CAN-unit has a unique identity, for example an EAN including a serial number. Each unit which will be able to be controlled also has a unique identity, for example an EAN including a serial number.

Data transfer of an eight-bit byte from the CPU 202A to the CPU 210A is effected such that 202A activates an interruption signal to 210A, which responds with an acknowledgement signal indicating that it is ready to receive data. (Otherwise a signal is activated which signifies "try again once more"). 202A presents a byte on the data bus and activates the signal "data are accessible". 210A reads the byte, acknowledges the transfer and stores it away in the memory 211A. This is repeated until all of the byte is transferred. Transfer from 210A to 202A is carried out in reverse.

Figure 15:
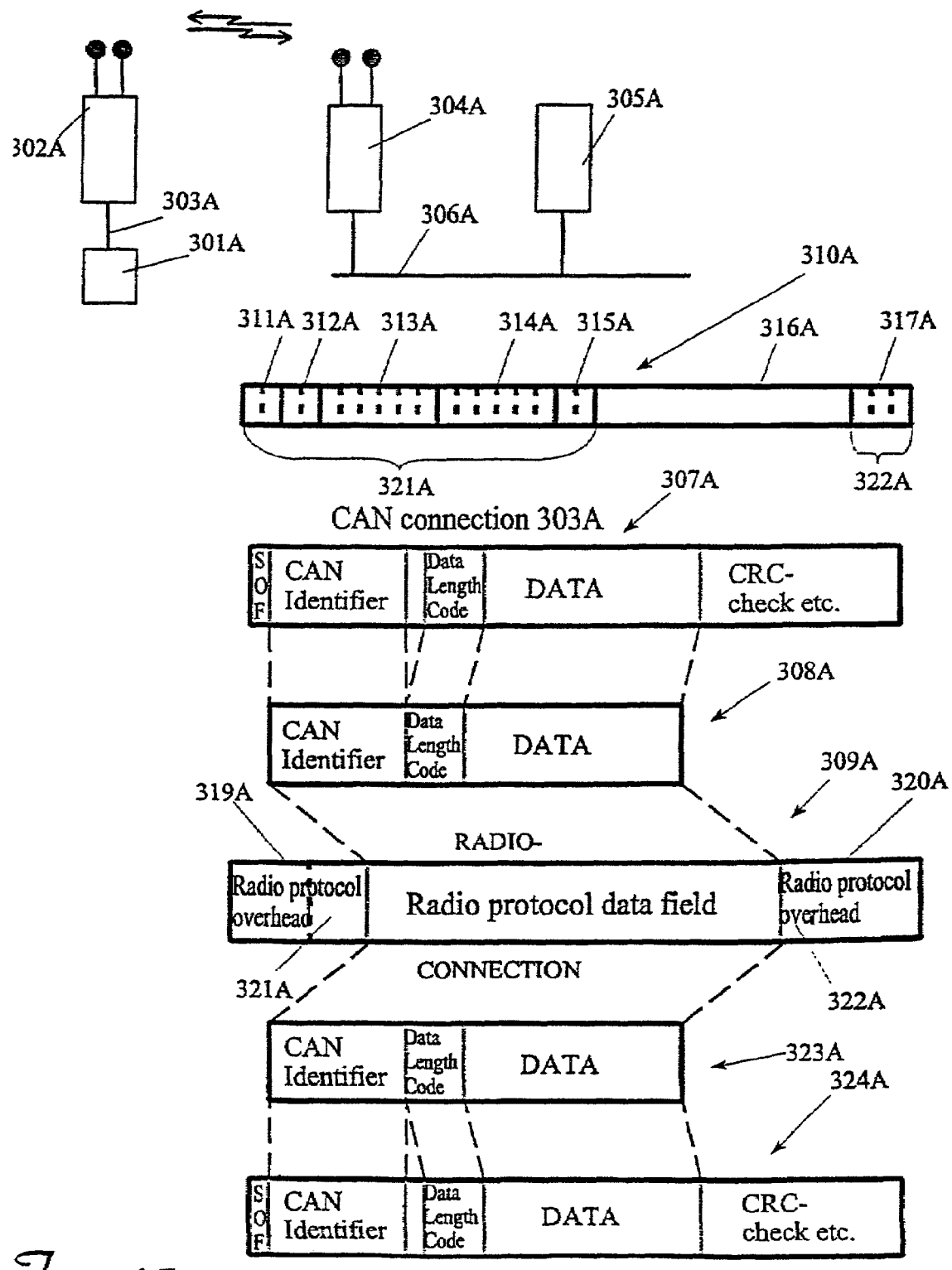
FIG. 15 shows in diagrammatic form the framework structure for digital signals which are used.

FIG. 15 describes a detailed illustrative embodiment of signaling from a module corresponding to the panel 13A according to FIG. 12, generation of a message and the shaping of the message and its insertion on the bus and reception in a module corresponding to 1A. FIG. 15 shows only an operator unit 301A connected to a communication unit 302A via a CAN-interface 303A and a communication unit 304A and a valve with control electronics 305A connected to a CAN-bus 306A. Other modules connected to 306A are not depicted, but the total system corresponds to that shown in FIG. 1. Both the units 302A and 304A each constitute a complete radio unit corresponding to the whole of the device in FIG. 2, i.e. the radio unit can send and receive a message both via a CAN-bus and via the ether. A modulation command to the valve 305A is generated from the operator unit 301A and is transferred as a CAN-message 307A to the CAN-Controller of the communication unit, which forwards the data 308A to the CPU in the CAN-part. This creates a message 309A formatted for the radio part.

309A is described in detail by 310A, which has the following byte sequence: an overhead block with the parts 321A and 322A, in which 321A comprises two bytes 311A which indicate the number of bytes making up the message inclusive of 311A, a two-byte sequential number 312A (for suppression of subsequent multiply transmitted radio messages) and a six-byte long destination address 313A, a six-byte long consignor address 314A, two bytes 315A indicating the number of bytes of user data 316A to follow, and the part 322A made up of two or three bytes 317A which conclude the string. The user data 316A are the same as 308A. The CPU in the radio part takes charge of the arrived string and converts it into a radio message 318A with a necessary overhead 319A—for setting up and synchronizing the radio transfer—and 320A for concluding the sequence and ensuring it was correct in terms of the CRC check total, etc. The radio overhead incorporates the information 321A and 322A. The radio module in the communication unit 304A receives the string 318A and recreates the string 310A, this being transferred to the CPU of the CAN-unit, which extracts 323A and creates the information for the CAN-Controller, which then, in turn, presents the CAN-message 324A on the CAN-connection 306A. The valve unit 305A now receives the command via the CAN-connection and implements the same, which can be verified by the operator.

The invention is not limited to the embodiment shown by way of example above, but can be subject to modifications within the framework of the subsequent patent claims and the inventive concept.

The invention claimed is:

1. A system for radio-controlling machines operating with the Controller Area Network (CAN) protocol, the system comprising:
    a number of machines that each have a radio communication means for communicating with another of said radio communication means, each machine having a number of modules interconnected by a digital serial connection that communicate with one another using the CAN system protocol;
    a key allocation means for determining which of said machines may communicate through a particular instance of a message channel established between a subset of said machines and a master control system or between a subset of said machines alone, said key allocation means dynamically assigning each of said machines, within the subset of machines assigned to a message channel, a unique identification during each instance of an established message channel; wherein:
    said master control system includes said key allocation means and each of said modules either includes said key allocation means or is capable of adopting an assigned identification from said key allocation means,
    said identification is based not upon the real identity of said machine, but is dynamically assigned during a communicative coupling between said master control system and said module within said machine or between a plurality of modules in separate machines, and
    said modules in any particular machine have unique identities and the unique identity of a particular module, or the unique identities of multiple modules in the machine form(s) the identity/identities for said particular machine's radio communication means.

2. The system of claim 1, wherein the respective module concerned is arranged such that a key-allocation-performing function is built into the module and/or is assignable to the module from a master system or systems.

3. The system of claim 1, wherein the modules in the CAN system of a particular unit have unique identities, and in that the unique identity/identities of one or more modules in the CAN-system forms the identity/identities for particular radiocommunication-performing equipment.

4. The system of claim 1, wherein a particular machine comprises a radio module, forming part of the machine's radio communication means, the machine can detect when the radio module is connected or activated, and the machines radio communication means adopts the identification of another particular module in the machine.

5. The system of claim 1, wherein the key allocation means allocates a public key identification, common to machines incorporated within an area, or a unique key identification, which therefore is based upon the identity of a particular module forming part of the machines which communicate by radio among themselves.

6. The system of claim 1, wherein the assignment of identifications is carried out by a system node selected within the device, which system node is aware of all nodes forming part of the device and in which no node can be connected or exchanged or work within the device without the consent or knowledge of the system node.

7. The system of claim 6, wherein the system node determines network key identifications, and a required hopping scheme or spread code in the radiocommunications.

8. The system of claim 6, wherein where there is both a machine and a remote control unit intercommunicating, the system node in the machine determines a common key identification for both the machine and the remote control unit.

9. The system of claim 1, wherein the network key identifications can be distributed exclusively, alternatively or as a supplement from a superordinate level, via a common communication channel, for a number of machines and remote control units, an area-common unit having complete information on the identities of all machines and remote control units within a particular area and the radiocommunication equipment ending up at a low level from the device viewpoint and being able to be exchanged without any security risks.

10. The system of claim 8, wherein a number of remote control units control a common machine, and a particular control command from a particular remote control unit is assignable or receivable in an identification device (bit pattern) in the controlled common machine, which identification device is disposed in the system node of the controlled machine.

11. The system of claim 10, wherein the control command can be received with the aid of a network key assigned to the controlling unit, and in that the system node selects the control command of a particular remote control unit according to a predetermined set of rules, which allow the remote control units to be connected at different time stages.

12. The system of claim 1, wherein a number of machines are assignable to a number of remote control units, non-activated machines listen in on a common channel assigned to a work site, in that whenever an idle machine is assigned to a remote control unit a radio center establishes contact with the idle machine and transfers a particular identification to the remote control unit, in that whenever the remote control unit is activated the communication means of the idle machine establishes contact with the radio communication means of the selected remote control unit via the common channel and reports its identification and the fact that it is master of the connection channel, and in that an exclusive channel between the machine and the remote control unit can in this case be set up, in which exclusive channel information is transferred.

13. The system of claim 1, wherein the machine is arranged with radio modules (WCANM), the sole task of which is to attend to the wireless radiocommunications.

14. The system of claim 1, wherein a plurality of remote control units each serve their own part-area within a work area, and in that, where a mobile unit is within the area, control over the mobile unit is passed from one remote control unit to another remote control unit as it passes through a part-area border.

15. The system of claim 1, wherein a module comprises a CPU containing a monitoring/control unit, memories, a CAN-Controller, a CAN-driver and adjustment circuits for communication via a CAN-connection, which monitoring/control unit can be coupled together via a connector to a radio unit comprising a radio communication part and a communication part, the last-named of which comprises a CPU, memory and adjustment circuits for communication.

16. The system of claim 1, wherein there are a plurality of machines, which are served by a control desk unit, a machine which requires action sends a message on the message channel, and in that at the control desk unit one or more items of information appear on the number of machines requiring assistance, the identity of the machines and the nature of the assistance, a selection facility being provided at the control desk unit for a choice of running order for serving the machines in need of action.

17. The system of claim 16, wherein there is a supervisory function from the control desk all machines make use of the same radio message channel and when a selected machine is serviced an exclusive radio message channel is established between the selected machine and the control desk unit.

* * * * *